United States Patent
Miki

(10) Patent No.: US 7,369,266 B2
(45) Date of Patent: May 6, 2008

(54) IMAGE-RECORDING APPARATUS AND METHOD FOR DIVIDING A COMPLETE IMAGE FOR RECORDING ONTO A PLURALITY OF RECORDING MEDIA

(75) Inventor: Motoharu Miki, Hachioji (JP)

(73) Assignee: Olympus Optical Co., Ltd., Tokyo (JP)

(*) Notice: Subject to any disclaimer, the term of this patent is extended or adjusted under 35 U.S.C. 154(b) by 954 days.

(21) Appl. No.: 10/625,793

(22) Filed: Jul. 23, 2003

(65) Prior Publication Data

US 2004/0125390 A1 Jul. 1, 2004

(30) Foreign Application Priority Data

Jul. 25, 2002 (JP) .............................. 2002-216980

(51) Int. Cl.
G06K 15/00 (2006.01)
G06K 15/02 (2006.01)

(52) U.S. Cl. ........................ 358/1.18; 358/1.2; 358/1.12

(58) Field of Classification Search ............... 358/1.15, 358/1.18, 450, 1.2, 1.12, 2.1, 3.23; 178/18.01
See application file for complete search history.

(56) References Cited

U.S. PATENT DOCUMENTS

| 5,481,375 A | * | 1/1996 | Eto et al. ................. 358/450 |
| 6,256,105 B1 | * | 7/2001 | Nobuaki et al. ........... 358/1.15 |
| 6,744,530 B1 | * | 6/2004 | Someno et al. ............ 358/1.18 |
| 7,094,977 B2 | * | 8/2006 | Ericson et al. ........... 178/18.01 |

FOREIGN PATENT DOCUMENTS

| JP | 5-238018 | | 9/1993 |
| JP | 08293996 A | * | 11/1996 |
| JP | 2002112010 A | * | 4/2002 |

* cited by examiner

Primary Examiner—King Y. Poon
Assistant Examiner—Lennin R Rodriguez
(74) Attorney, Agent, or Firm—Frishauf, Holtz, Goodman & Chick, P.C.

(57) ABSTRACT

An image-recording apparatus 1 includes image recording assembly 60 and a control section 40 having image-processing section 44. The image-processing section divides the image data indicative of the complete image into a plurality of image data pieces indicative of divided images, detects two adjoining divided-images that individually have a joint portion and adjoin each other at the respective joint portions, in the divided images indicated by the divided image data pieces and rotates one of the adjoining divided-images so as to make a recording direction of one of the adjoining divided-images opposite to a recording direction of the other adjoining divided-image. The control section controls the image recording assembly so that a recording medium carries in one direction during recording all divided-images. The divided images are recorded on the respective recording-media one by one to form a plurality of output images. The plurality of output images configure one complete image.

13 Claims, 16 Drawing Sheets

IMAGE-RECORDING APPARATUS AND METHOD FOR DIVIDING A COMPLETE IMAGE FOR RECORDING ONTO A PLURALITY OF RECORDING MEDIA

CROSS-REFERENCE TO RELATED APPLICATIONS

This application is based upon and claims the benefit of priority from the prior Japanese Patent Application No. 2002-216980, filed Jul. 25, 2002, the entire contents of which are incorporated herein by reference.

BACKGROUND OF THE INVENTION

1. Field of the Invention

The present invention relates to an image-recording apparatus and a method that records images on a recording-medium. The present invention also relates to a program for processing images recorded on the recording-medium.

2. Description of the Related Art

An image-recording apparatus such as an ink jet printer records images by sticking ink to a recording-medium such as paper. The image-recording apparatus has a recording-head for discharging ink to the recording-medium, a carriage for holding the recording-head, a recording-medium-carrying mechanism for carrying the recording-medium, and carriage-driving assembly for moving the recording-head in a direction (main scanning direction) orthogonal to a carrying direction (subscanning direction) of the recording-medium by the recording-medium-carrying mechanism.

Such an image-recording apparatus is operated so as to form one desired image. In the specification, one desired image recorded by the image-recording apparatus is referred to as a "complete image". To record the complete image, image data of the complete image is supplied to the image-recording apparatus. In the specification, image data, which becomes a basis for the complete image is referred to as "basic image data".

Such an image-recording apparatus first obtains the basic image data in order to record the complete image. Then, the image-recording apparatus records the complete image based on the basic image data. Specifically, the image-recording apparatus drives the carriage in the main scanning direction. The image-recording apparatus applies ink drops to the recording-medium by the recording-head, which moves in conjunction with the driving. Accordingly, the image-recording apparatus is operated to land ink drops substantially at equal pitches in the main scanning direction, and to record an image equivalent to a width of the recording-head. The image-recording apparatus repeats this operation for the recording-medium sequentially carried in the subscanning direction. By this repeated operation, the image-recording apparatus records the desired entire image (complete image) on the recording-medium.

If a width of the complete image is larger than a width of the recording-medium in the main scanning direction, the image-recording apparatus divides the complete image into a plurality of images, and records them on recording-media, respectively. Specifically, as shown in FIG. 25, the image-recording apparatus first reads basic image data GD in order to record a complete image CG larger in width than the recording-medium. Then, the image-recording apparatus divides this basic image data GD into two divided-images SG substantially equal in width to the recording-medium in the main scanning direction. In other words, the basic image data GD is divided so that the two divided-images SG may be arrayed in the main scanning direction. Thus, the divided-images SG are arrayed in width directions of their own. The width array direction which is the arraying direction of each of the divided-images SG is indicated by a reference code dw in FIG. 25.

Subsequently, the image-recording apparatus records each of the divided-images SG on the respective recording-medium to form an output image OG for the each of the divided-image SG. The output image OG has one end OGa and the other end OGb in the main scanning direction. In other words, the output image OG has one end OGa and the other end OGb in the width direction of the recording-medium. One end OGa corresponds to one end of the recording-medium, and the other end OGb corresponds to the other end of the recording-medium. The output image OG is recorded by the recording-head, which is moved from one end OGa to the other end OGb. Accordingly, in the main scanning direction, one end OGa is a recording-start position sp of the recording-head, and the other end OGb is a recording-end position ep of the recording-head. In FIG. 25, a moving direction of the recording-head in the main scanning direction is indicated by an arrow md.

Each of the divided-images SG arrayed in the width array direction ds is recorded on the output image OG. Thus, the output images OG are arrayed in the width array direction dw as in the arraying case of the divided-images SG to form the complete image CG. Specifically, the complete image CG is formed by connecting the other end OGb of one output image with one end OGa of the other output image. As shown in FIG. 25, in the complete image CG, a joined portion between the two output images OG is indicated by a reference code JP.

Thus, in order to form one complete image CG, the image-recording apparatus divides the basic image data GD to record them on the plurality of recording-media.

A temperature increase of the recording-head accompanying the image recording causes a gradual reduction in viscosity of the ink in the recording-head. In the recording-head, if the viscosity of the ink is reduced, the amount of ink drops discharged at a time is increased, and a diameter of an ink dot to be recorded is enlarged. Since the recording-head carries out recording by discharging ink while moving in the main scanning direction, an optical density (OD) of the image recorded by the recording-head is gradually increased in the main scanning direction. In the output image OG, the recording-start position sp in the main scanning direction is one end OGa, and the recording-end position ep is the other end OGb. Because of a density difference in the main scanning direction, an optical density varies from one end OGa to the other end OGb. An optical density difference between one end OGa and the other end OGb of the output image OG may become about 0.02 or higher.

Generally, human vision recognizes a difference in image density between adjacent images when an optical density difference between the adjacent images is about 0.02 or higher. In the output image OG, the recorded image is continuous from one end OGa to the other end OGb, and the optical density is gradually changed from one end OGa to the other end OGb. Thus, even if the optical density difference between one end OGa and the other end OGb is about 0.02 or higher, the general human vision does not recognize the image density difference in the output image OG.

However, as described above, when the plurality of output images OG are combined to form the complete image CG, one end OGa of one output image OG is adjacent to the other end OGb of the other output image OG in the joined portion JP of the complete image CG. That is, in the joined portion JP, the image recorded in the recording-start position sp and the image recorded in the recording-end position ep are adjacent to each other. This occurs because the recording-start positions of one output image OG and the other output image OG in the main scanning direction are arranged in the same direction (left side in FIG. 25).

Thus, if each output image OG has an optical density difference of 0.02 or higher between one end OGa and the other end OGb as described above, an optical density difference between the adjacent images becomes 0.02 or higher in the joined portion JP as shown in FIG. 26. Accordingly, an observer who observes the complete image CG recognizes that the image density of the complete image is discontinuous in the joined portion JP that is a boundary between the two output images OG. As a result, the complete image CG is recognized to be bad in quality as one image.

To solve the above problem, Jpn. Pat. Appln. KOKAI Publication No. 5-238018 discloses an image-recording apparatus. The image-recording apparatus of Jpn. Pat. Appln. KOKAI Publication No. 5-238018 is configured similarly to the aforementioned image-recording apparatus, but different in a recording method when an image larger than the width of the recording-medium in the main scanning direction. Hereinafter, description will be made of an image forming method of the image-recording apparatus of the publication.

The image-recording apparatus of the publication reads basic image data GD to be recorded. Then, the image-recording apparatus divides the basic image data GD into a plurality of divided-images SG substantially equal in width to the recording-medium in the main scanning direction. As in the case of the aforementioned image-recording apparatus, the basic image data GD is divided so that the divided-images SG may be arrayed in the main scanning direction. The basic image data GD is divided into two divided-images SG as in the case of the aforementioned conventional image-recording apparatus.

Subsequently, one image SG is recorded to form an output image OG' as in the case of the aforementioned conventional image-recording apparatus. Thus, in the output image OG', a recording-start position sp and a recording-end position ep are similar to those of the aforementioned conventional image-recording apparatus.

The other image SG is recorded to form an output image OG" by moving the recording-head in a direction opposite to a direction md' for recording the output image OG'. In FIG. 27, a moving direction of the recording-head when the output image OG" is recorded is indicated by an arrow md". Thus, recording of the output image OG' is started from the left side on the recording-medium in FIG. 27. Recording of the output image OG" is started from the right in FIG. 27. Thus, when the output image OG" is recorded, the recording-start position sp is set on the other end 0Gb" side, and the recording-end position ep is set on one end OGa" side as shown in FIG. 27. That is, the output image OG' and the output image OG" are opposite to each other in recording-start positions sp and recording-end positions ep in the scanning direction.

The recorded output images OG', OG" are arrayed as in the case of the divided-images SG to form a complete image CG. Thus, as in the case of the aforementioned conventional image-recording apparatus, the complete image CG is formed by connecting the other end OGb' of the output image OG' with one end OGa" of the output image OG". However, the output image OG' and the output image OG" are opposite to each other in the recording-start positions sp and the recording-end positions ep in the main scanning direction. Accordingly, images recorded in the recording-end positions ep of the output image OG' and the output image OG" are adjacent to each other in the joined portion JP. As a result, the image-recording apparatus of the publication enables recording of each output image so as to form a complete image without any quality deterioration even if there is an optical density difference between one end OGa and the other end OGb of each of the output images OG' and OG" due to a temperature increase of the recording-head.

However, the cause of the optical density difference between one end OGa and the other end OGb of the output image OG is not limited to the main scanning direction movement of the recording-head which temperature is increased by driving such as ink discharging. For example, the optical density difference of the output image may occur because of ink absorption characteristics of the recording-medium. For example, coated paper as a recording-medium on which surface a coating solution is applied is manufactured as follows. First, as shown in FIG. 28, a coating solution 203 is applied on paper 201 as a recording-medium by a coating device 202. After the application of the coating solution 203, the paper 201 is dried by an oven 204. The coated paper is dried and wound in a roll to be completed.

In the above manufacturing, the applied coating solution must be uniform in thickness throughout the entire width direction of the paper. However, if there is variance in coating accuracy in the paper width direction by the coating device, the amount of coating varies in the paper width direction. Consequently, coated paper that varies in a thickness of a coated layer in the paper width direction is manufactured. Additionally, in the oven 204, heat is concentrated in the center rather than in both ends in the width direction of the recording-medium. Consequently, in the coated paper, a difference is generated in drying of the coating solution between the center and both ends. Thus, ink absorption characteristics vary from both ends to the center. Because of variance in carrying accuracy of a sheet may cause a misalignment between the coated paper and the oven. In this case, a difference may be generated in ink absorption characteristics between one end and the other end of the coated paper, which may cause a density difference or a color tones difference such as a color difference. At a place of good ink absorption characteristics, an image density becomes thick because ink is received well. At a place of bad reception characteristics, an image density becomes thin because ink is not received well.

As causes of the optical density difference between one end OGa and the other end OGb of the output image OG, there are variance in platen gap (gap between the head and a platen) due to mechanical accuracy difference, variance in ink dot alignment in multipass, etc.

The image-recording apparatus of the publication cannot solve the optical density difference or the color tones difference generated between one end OGa and the other end OGb of the output image OG by the cause other than the main scanning direction movement of the recording-head which temperature is increased by the driving such as ink discharging. Particularly, when there is variance in assembling accuracy of members the carriage-driving assembly or driving control accuracy of the carriage, an image density varies from one end to the other end in the main scanning direction, or the characteristics of the recording-medium in the width direction is not uniform, it is difficult to solve the optical density difference simply by changing the movement start position or moving direction of the recording-head in the main scanning direction.

Therefore, there is a demand for an image-recording apparatus in which a density difference in a joined portion of a recording-medium after recording is not visually conspicuous when an image output larger in width than the recording-medium in a main scanning direction is divided to be recorded on a plurality of recording-media, and which can obtain a large image output of high recording quality.

BRIEF SUMMARY OF THE INVENTION

According to an aspect of the present invention, there is provided an image-recording apparatus which divides a complete image larger in width than a recording-medium into a plurality of images and, records the divided images on a plurality of recording-media, comprising:

image recording assembly that has a recording-head to record an image on the recording-medium, and a recording-medium-carrying mechanism to carry the recording-medium relatively to the recording-head; and a control section that has an image-processing section to subject image data to image processing, and controls the image recording assembly, wherein the image-processing section divides the image data indicative of the complete image into a plurality of image data pieces indicative of divided images, detects two adjoining divided-images that individually have a joint portion and adjoin each other at the respective joint portions, in the divided images indicated by the divided image data pieces and rotates one of the adjoining divided-images so as to make a recording direction of one of the adjoining divided-images opposite to a recording direction of the other adjoining divided-image, the control section controls the image recording assembly so that a recording medium carries in one direction during recording all divided-images, the divided images are recorded on the respective recording-media one by one to form a plurality of output images, and the plurality of output images configure one complete image.

According to an aspect of the present invention, there is provided an image forming method which divides a complete image larger in width than a recording-medium into a plurality of images, and records the divided images on a plurality of recording-media, comprising:

detecting two adjoining divided-images, recording one divided image from above and the other divided image from bottom among divided images corresponding to divided image data of image data of the complete image recorded on the recording-media.

According to another aspect of the present invention, there is provided an image forming method that divides a complete image larger in width than a recording-medium into a plurality of images, and record the divided images on a plurality of recording-media, comprising:

dividing image data of the complete image into a plurality of divided image data so as to become such an image width that the image is recorded on the recording-medium; and recording divided images so that joined portions of two divided images to be joined to each other are at one position in a width direction of the recording-medium.

According to the other aspect of the present invention, there is provided an image forming method divides a complete image larger in width than a recording-medium into a plurality of images, connects a plurality of recording-media so as to be formed the complete image by connecting the plurality of divided images, and mutually connects both ends of the complete image, comprising:

dividing the complete image into an even number;

detecting two divided-images corresponding to both is ends of the complete image, to join each other, and setting one of the two divided-images so as to make a recording direction of one of the adjoining divided-images opposite to a recording direction of the other two divided-images, and to be located the joint portions of the two divided-images on one position in a width direction of a recording-medium.

According to an aspect of the present invention, there is provided an image processing program that causes an arithmetic unit to realize:

an image acquisition function to obtain image data of a complete image;

an image division function to divide the image data of the complete image into a plurality of divided image data pieces in at least one direction;

an image selection function to select every other divided image data piece to be processed in one predetermined direction;

an image rotation function to rotate the selected divided image data piece by about 180°; and an image-recording apparatus control function to control an image-recording apparatus so that each divided image data pieces may be recorded on one recording-medium.

Additional objects and advantages of the invention will be set forth in the description which follows, and in part will be obvious from the description, or may be learned by practice of the invention. The objects and advantages of the invention may be realized and obtained by assembly of the instrumentalities and combinations particularly pointed out hereinafter.

BRIEF DESCRIPTION OF THE SEVERAL VIEWS OF THE DRAWING

The accompanying drawings, which are incorporated in and configure a part of the specification, illustrate embodiments of the invention, and together with the general description given above and the detailed description of the embodiments given below, serve to explain the principles of the invention.

DETAILED DESCRIPTION OF THE INVENTION

Next, the embodiments of the present invention will be described by referring to the accompanying drawings. First, description will be made of the first embodiment by referring to FIG. 1.

First Embodiment (Constitution)

Figure 1:
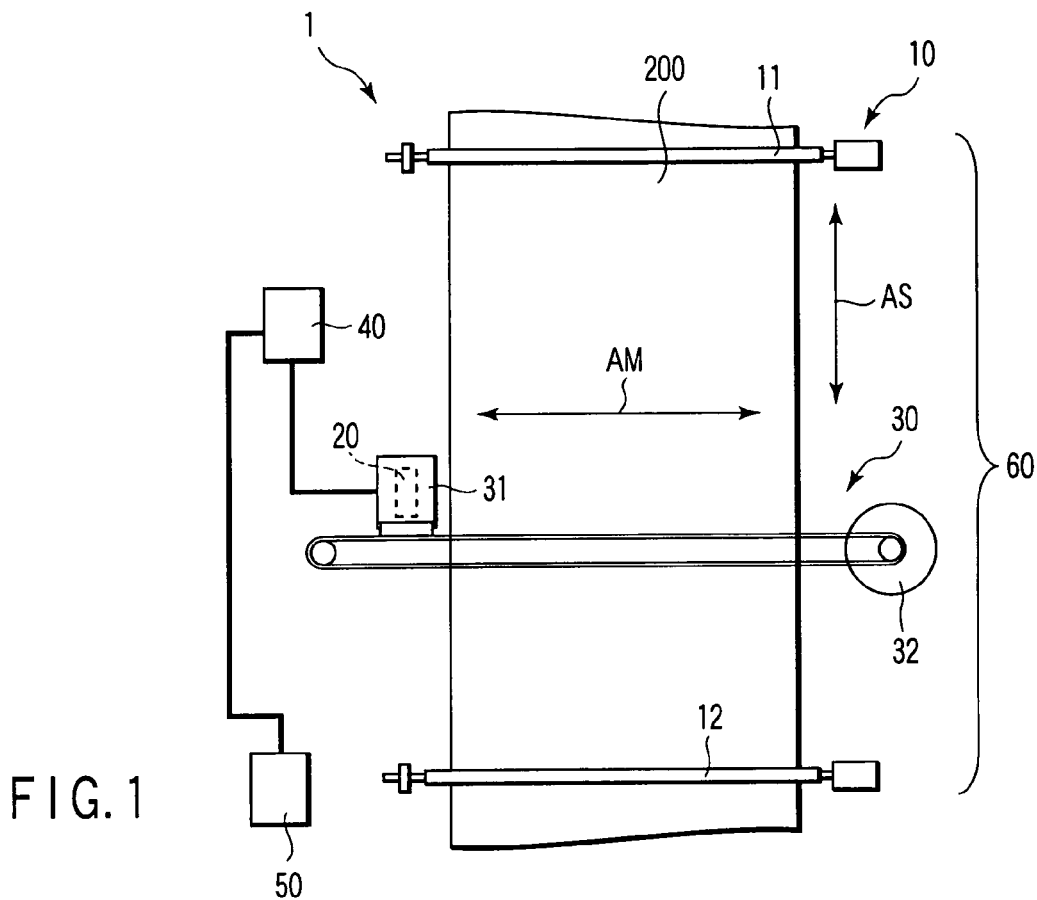
FIG. 1 is a schematic front view showing an image-recording apparatus according to a first embodiment.

First, the first embodiment will be described by referring to FIG. 1. FIG. 1 is a schematic front view showing an image-recording apparatus of the embodiment.

The image-recording apparatus 1 of the embodiment discharges ink to record images on a recording-medium 200. The image-recording apparatus 1 has a recording-medium-carrying mechanism 10, a recording-head 20, a head driving mechanism 30, and a control section 40.

The recording-medium-carrying mechanism 10 has carrier rollers 11, 12. The recording-medium-carrying mechanism 10 cooperatively operates the carrier rollers 11, 12 to carry the recording-medium 200 in a predetermined direction. In the embodiment, the recording-medium 200 of a rolled shape is used. The recording-medium 200 is carried from the upper side to the lower side in FIG. 1. The recording-head 20 is connected to a not-shown ink supply source. The recording-head 20 discharges ink to the recording-medium 200. The head driving mechanism 30 has a carriage 31, and a carriage driving mechanism 32. The carriage 31 holds the recording-head 20. The carriage driving mechanism 32 moves the recording-head 20 in a direction (main scanning direction) orthogonal to a carrying direction (subscanning direction) of the recording-medium 200. Thus, the carriage driving mechanism 32 can move the recording-head 20 via the carriage 31. In FIG. 1, the subscanning direction is a direction along an arrow denoted by a reference code AS. The main scanning direction is a direction along an arrow denoted by a reference code AM. The subscanning direction substantially coincides with a width direction of the recording-medium.

The recording-medium-carrying mechanism 10, the recording-head 20 and the head driving mechanism 30 configure the image recording assembly 60 to cooperatively record an image on the recording-medium 200.

The control section 40 controls an operation of the image recording assembly 60. The control section 40 is connected to the recording-head 20 to control driving of the recording-head 20. The control section 40 is connected to an image supply device such as a computer 50. The image supply device can be replaced by the other well-known device such as a scanner, a digital camera or a FAX, which can supply image data of an image to be recorded to the image-recording apparatus 1.

Figure 2:
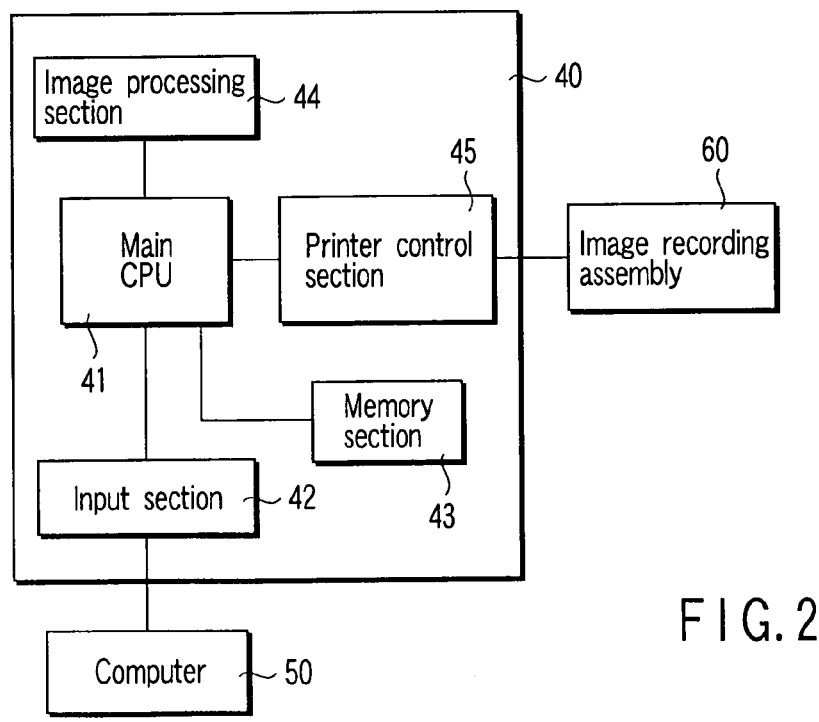
FIG. 2 is a view showing a control section of the image-recording apparatus of FIG. 1.

Hereinafter, the control section 40 will be described more in detail by referring to FIG. 2. The control section 40 has a main CPU 41, an input section 42, a memory section 43, an image-processing section 44, and a printer control section 45. The main CPU 41 is in charge of control of the control section 40. The input section 42 is a joined portion of the image supply device. The memory section 43 stores image data from the computer 50, a calculation result from the main CPU 41 etc. The image-processing section 44 subjects the image data sent from the main CPU 41 to image processing. The printer control section 45 controls driving of the image recording assembly 60 based on a command from the main CPU 41.

(Operation)

Hereinafter, an operation of the image-recording apparatus 1 of the foregoing construction will be described. Especially, description will be made of an operation when the image-recording apparatus 1 records a complete image CG larger in width than a recording-medium. The image-recording apparatus 1 of the embodiment is not limited to the following image recording-mode, but records an image in a one-path one-direction-printing mode. In the embodiment, it is assumed that the computer 50 stores basic image data GD which is image data of the complete image CG recorded by the image-recording apparatus 1, and a recording-medium width RW which is a width of the recording-medium. In the embodiment, the basic image data GD is image data of a rectangular image long in a width direction. In the case of recording at predetermined resolution (e.g., 300 dpi), the basic image data GD is image data that has a width equal to that of the complete image recorded on the recording-medium. As an example, the basic image data GD is graphic data of a picture showing a house.

When recording an image larger in width than the recording-medium, the image-recording apparatus 1 divides the complete image CG into a plurality of images substantially equal in width to the recording-medium, and records them on the recording-media, respectively. That is, the image-recording apparatus 1 divides the basic image data GD into a plurality of image data, and records images corresponding to the image data on the recording-media, respectively. Then, the images are connected, and form one complete image.

Figure 3:
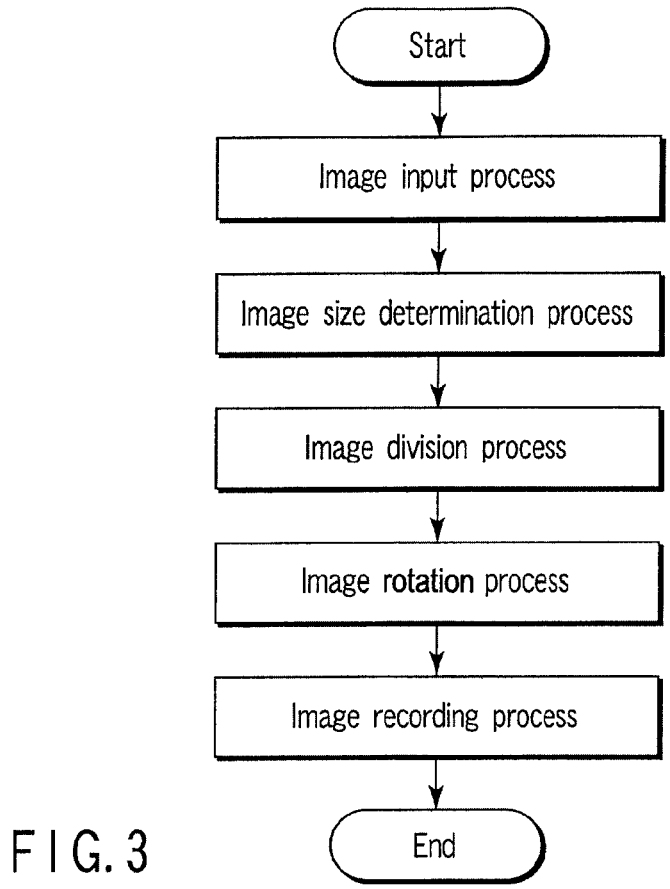
FIG. 3 is a flowchart showing an operation of the image-recording apparatus of FIG. 1.

In order to form such a complete image CG, the image-recording apparatus 1 carries out an image input process, an image size determination process, an image division process, an image rotation process, and an image recording process as shown in FIG. 3.

[Image Input Process] First, the image input process is carried out. In this image input process, the basic image data GD and the recording-medium width RW are entered through the input section 42 to the image-recording apparatus 1. The basic image data GD and the recording-medium width RW are stored in the memory section 43. The recording-medium width RW is a maximum size to be recorded on the recording-medium in the width direction by the image-recording apparatus 1. The main CPU 41 reads a basic image data width GW that is a width of the basic image data GD, and stores it in the memory section 43. Subsequently, the image size determination process is carried out. The basic image data width GW is a size in a width direction of the basic image data GD at predetermined resolution.

[Image Size Determination Process] In the image size determination process, the basic image data width GW is compared with the recording-medium width RW. If the basic image data width GW is larger than the recording-medium width RW, the basic image data GD can not be recorded on one recording-medium. Thus, the basic image data GD is divided into a plurality of image data equal in width to the recording-medium width RW so as to be recorded separately on a plurality of recording-media in the subsequent image division process.

If the basic image data width GW is smaller than the recording-medium width RW, the basic image data GD is directly recorded on the recording-medium by the image recording assembly 60. In this case, by this recording, the image-recording apparatus 1 forms a desired complete image CG on the recording-medium, and then finishes the recording.

[Image Division Process] In the image division process, the image-processing section 44 divides the basic image data GD to be recorded on a plurality of recording-media of predetermined sizes. As described above, in the embodiment, the recording-medium of a rolled shape is used. Thus, even data relatively long in a direction orthogonal to the width of the basic image data GD can be recorded. Therefore, the image-processing section 44 divides the basic image data GD sequentially from one end to the other end (left and right direction in FIG. 4) of the basic image data GD in the width direction for each recording-medium width RW. As a result, the image of the basic image data GD is divided into a plurality of divided-images SG arrayed in the width direction of their own. Thus, the basic image data GD is divided into image data of the plurality of divided-images SG. These divided-images SG are arrayed in the width direction of their own. A width arraying-direction, which is the arraying direction of the divided-images SG is denoted by a reference code dw in FIG. 4. Resolution of the image data of the divided-images SG is equal to that of the basic image data GD.

Figures 4, 5:
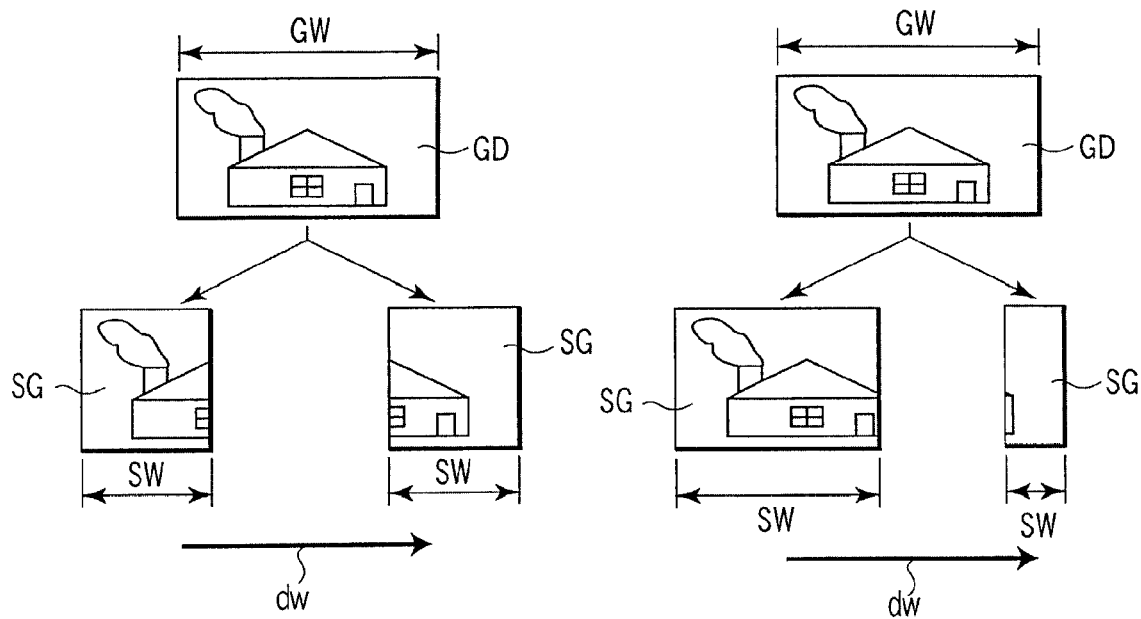
FIG. 4 is a view showing divided images formed in the first embodiment.
FIG. 5 is a view showing divided images formed in the first embodiment.

In order to divide the basic image data GD as described above, a total division number SC which is the number of divisions of the basic image data GD is obtained. The total division number SC becomes a quotient of dividing the image data width GD by the recording-medium width RW. In the specification, the term "quotient" indicates an integer portion of a division result. For example, if the basic image data width GW is 4 m and the recording-medium width RW is 2 m, a quotient is 2 without any surplus. Thus, as shown in FIG. 4, the image indicated by the basic image data GD is divided into two images SG. In this case, widths SW of the divided-images SG are all uniform.

If there is surplus when the basic image data GW is divided by the recording-medium width RW, the total division number SC takes a value obtained by adding 1 to the quotient. For example, if the basic image data width GW is 4 m and the recording-medium width RW is 3 m, a quotient becomes 1 with surplus. The total division number SC accordingly takes a value obtained by adding 1 to 1 of the quotient. Thus, the basic image data GD is divided into image data so as to have two divided-images SG. As shown in FIG. 5, if the basic image data width GW is 4 m and the recording-medium width RW is 3 m, a width SW of one divided image SG is set to 3 m equal to the recording-medium width RW, while a width SW of the divided image SG of the other end is set to 1 m.

The divided-images SG are formed by dividing the image of the basic image data GD sequentially from one end in the width direction thereof. Each divided image SG is a part of the image of the divided basic image data GD, and extended in a direction (longitudinal direction) orthogonal to the width. Thus, each divided image SG is distant from the first-formed divided image in the width-arraying direction dw in order of the formation. The divided-images SG are arranged in the width-arraying direction dw in order of the formation from the first-formed divided image to at last. It can therefore be said that the arrangement of the divided-images SG in the width-arraying direction dw corresponds to the order of formation. Accordingly, the main CPU 41 stores the order of forming the divided-images SG as width-direction-order-data WD in the memory section 43 each time the basic image data GD is divided into images. The main CPU 41 stores the image data of each divided image SG in the memory section 43 corresponding to the width-direction-order-data WD. The total number of divided-images SG is also stored as the total division number SC in the memory section 43. Thus, the image division process is finished. Subsequently, the image rotation process is carried out.

Figure 6:
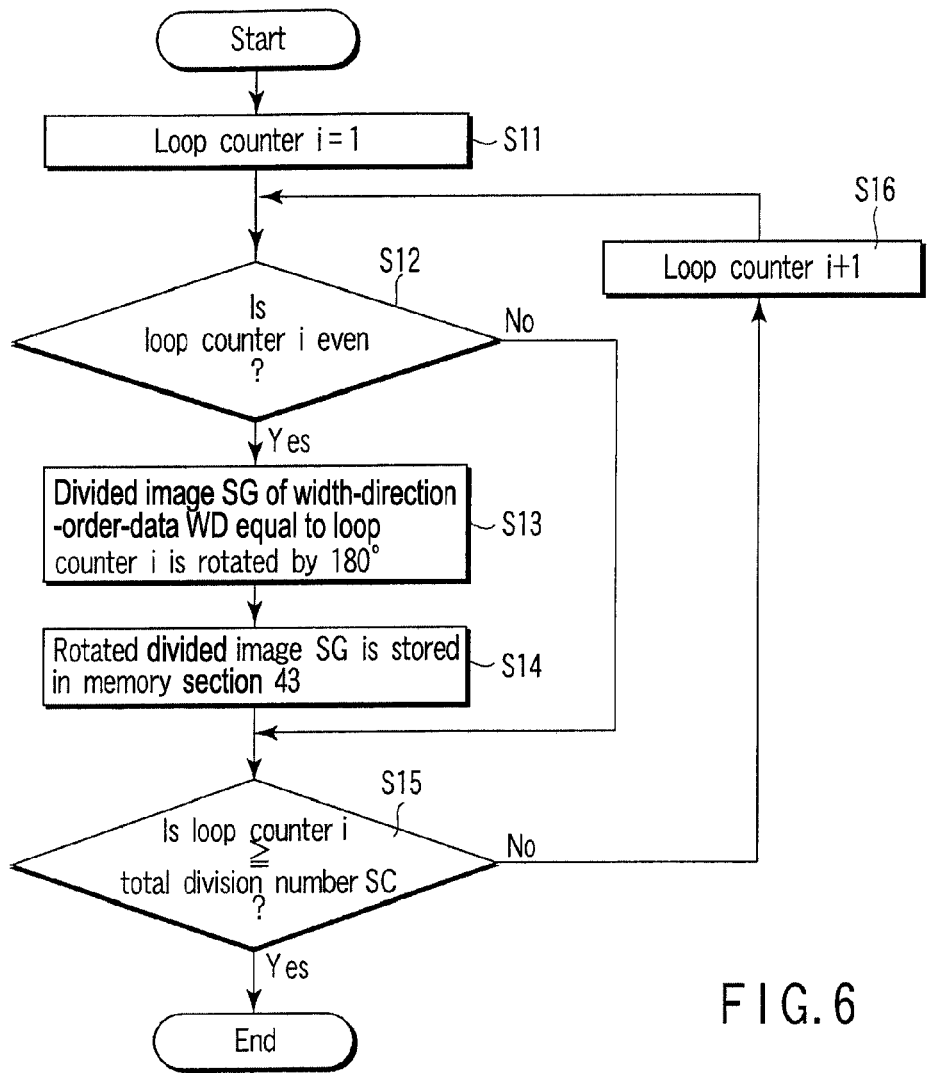
FIG. 6 is a flowchart showing a control procedure in an image rotation process.

[Image Rotation Process] The image rotation process will now be described by referring to FIG. 6. FIG. 6 is a flowchart showing a control procedure in the image rotation process.

In the image rotation process, the image-processing section 44 carries out image processing for the divided image SG selected by the main CPU 41 so as to make a direction of each divided image SG different from that of the adjacent divided image SG. This image processing will be described in detail in the following process.

(Step S11) In the image rotation process, the main CPU 41 counts the number of loops of image processing in order to carry out the image processing for each divided image. The number of loops of the image rotation process is stored as a loop counter i in the memory section 43. To carry out the loop from the first, a value of the loop counter i is initialized to 1 in step S11. After step S11, step S12 is subsequently carried out.

(Step S12) In step S12, determination is made as to whether the value of the loop counter i is even or odd. If this determination shows that the loop counter i is odd, then step S15 is carried out. If the determination shows that the loop counter i is even, then step S13 is carried out.

Figure 7A:
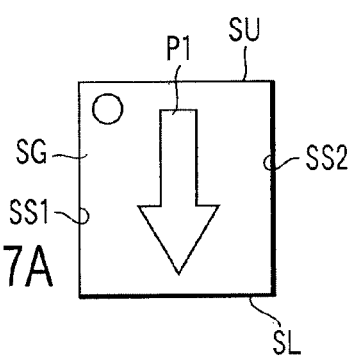
FIG. 7A is a view showing a divided image before rotation.
Figure 7B:
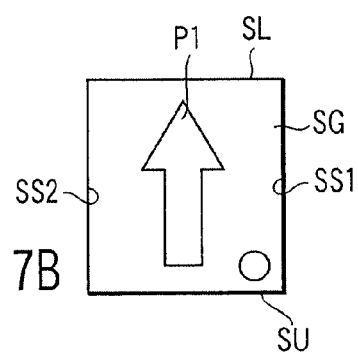
FIG. 7B is a view showing a divided image after rotation.

(Step S13) In step S13, from all the divided-images SG, a divided image SG corresponding to the width-direction-order-data WD which has a value equal to that of the loop counter i is selected. Then, the selected divided image SG is rotated by 180° by the image-processing section 44. In other words, the selected divided image SG is rotated so as to be point-symmetrical to the original image. For example, in the divided image SG of FIG. 7A, an arrow P1 downward on a paper surface is drawn. Such a divided image SG is rotated by the image-processing section 44 as shown in FIG. 7B. This rotation directs the arrow P1 of FIG. 7B upward. That is, the divided image SG is rotated so that the direction of the image may be made opposite to the direction orthogonal to the width direction. Thus, an upper portion SU of the divided image SG is positioned on the upper side of the paper surface before the rotation, and the upper portion SU of the divided image SG is positioned on the lower side of the paper surface after the rotation. Similarly, a lower portion SL is positioned on the upper side of the paper surface after the rotation. In FIGS. 7A, 7B, one end of the divided image in width is indicated by a reference code SS1, and the other end is indicated by a reference code SS2. In this case, one end SS1 and the other end SS2 are switched in positions after the rotation. After step S13, step S14 is then carried out.

(Step S14) In step S14, the divided image rotated in step S13 is correlated to the width-direction-order-data WD, and is stored in the memory section 43. After step S14, step S15 is then carried out.

(Step S15) In step S15, the value of the loop counter i is compared with the value of the total division number SC. The total division number SC is equivalent to the total number of divided-images SG. Thus, if the loop counter i is equal to the value of the total division number SC, it can be considered that step S12 has been carried out for all the divided-images SG. Accordingly, when the value of the loop counter i is equal to the value of the total division number SC, the image rotation process is finished. If the loop counter i is smaller than the value of the total division number SC, step S16 is then carried out.

(Step S16) In step S16, 1 is added to the value of the loop counter i. Thus, the first loop of the image rotation process is finished. Then, step S12 is carried out again.

Figure 8A:
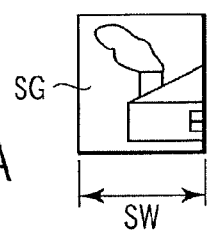
FIG. 8A is a view showing the divided image of FIG. 4 before rotation.
Figure 8B:
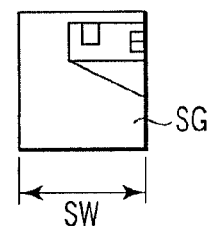
FIG. 8B is a view showing the rotated divided image of FIG. 7A.

When the image rotation process is carried out, the divided-images SG formed at all even numbers are rotated. That is, in the width direction of the basic image data GD (i.e., width-arraying direction dw), nonrotated divided-images SG and rotated divided-images SG are alternated. If the basic image data GD is divided as shown in FIG. 4, since the first-formed divided image SG is not rotated, it is stored in the memory section 43 in the same state as that of the formation as shown in FIG. 8A. The second-formed divided image SG is rotated to be stored in the memory section 43 in a state where the image is directed downward as shown in FIG. 8B. After the end of the image rotation process, then the image recording process is carried out.

[Image Recording Process] In the image recording process, each divided image is printed on one recording-medium. Thus, the main CPU 41 sends the image data of the divided-images SG in order of small width-direction-order-data WD to the printer control section 45, and issues an image recording command to the printer control section 45. Upon having received the image recording command, the printer control section 45 controls the image recording assembly 60 to record each divided image SG on the recording-medium.

Specifically, the printer control section 45 controls the head driving mechanism 30 to move the recording-head 20 from one end of the recording-medium in the width direction to the other end. That is, the recording-head 20 is moved from one to the other in the main scanning direction. The recording-head 20 discharges ink to the recording-medium while it is moved in the main scanning direction. Accordingly, an image equivalent to the recording width of the recording-head 20 in the subscanning direction is formed on the recording-medium in the main scanning direction. At this time, the main scanning direction substantially coincides with the width direction of the divided image SG.

After the formation of the image in the main scanning direction in such a manner, the recording-head 20 is returned to one end side of the recording-medium again. During this recording-head movement, no ink is discharged. Then, the recording-medium-carrying mechanism 10 carries the recording-medium in the subscanning direction by an amount equivalent to the recording width of the recording-head 20. In the recording, the subscanning direction substantially coincides with a direction orthogonal to the width direction of the divided image SG. After the end of the carrying, the recording-head 20 records the image again in the main scanning direction. By repeating the above operation, output images OG where the divided-images SG are recorded are formed on the recording-media.

The divided-images SG are sequentially recorded in order of small width-direction-order-data WD in the image recording process. The recording-head 20 is moved from one end of the recording-medium to the other end in the main scanning direction during the recording of all the divided-images SG. The recording-medium-carrying mechanism 10 always carries the recording-medium in the subscanning direction during the recording of all the divided-images SG. The divided image SG where the number of width-direction-order-data WD is even is rotated as shown in FIG. 7B, while the divided image SG where the number of width-direction-order-data WD is odd is not rotated as shown in FIG. 7A. Thus, the divided image SG where the number of width-direction-order-data WD is odd is recorded from the upper side (upper portion SU in FIG. 7A). The divided image SG where the number of width-direction-order-data WD is even is recorded from the lower side (lower portion SL in FIG. 7B). Accordingly, it can be said that the image recording assembly 60 records each divided image SG from a recording-direction different from the recording-direction of the adjacent divided image SG. Above-mentioned, the image recording assembly 60 records each of the output images OG. For the recorded output images OG different from each other in direction, as shown in uppermost stage of FIG. 9, one end OS1 is positioned on the left while the other end OS2 is positioned on the right. In the two output images OG, a recording-start position sp of the recording-head 20 is set on one end OS1 side, while a recording-end position ep is set on the other end OS2 side.

In the embodiment, the width-direction-order-data WD indicates a position of each divided image SG in the width direction of the basic image data GD. Further, the image recording assembly 60 outputs the output images OG in order of the width-direction-order-data WD. Thus, the image recording assembly 60 sequentially outputs the output images where the divided-images SG different from each other in direction are recorded.

Thus, the image-recording apparatus 1 divides one basic image data GD to record divided images on a plurality of recording-media.

Figure 9:
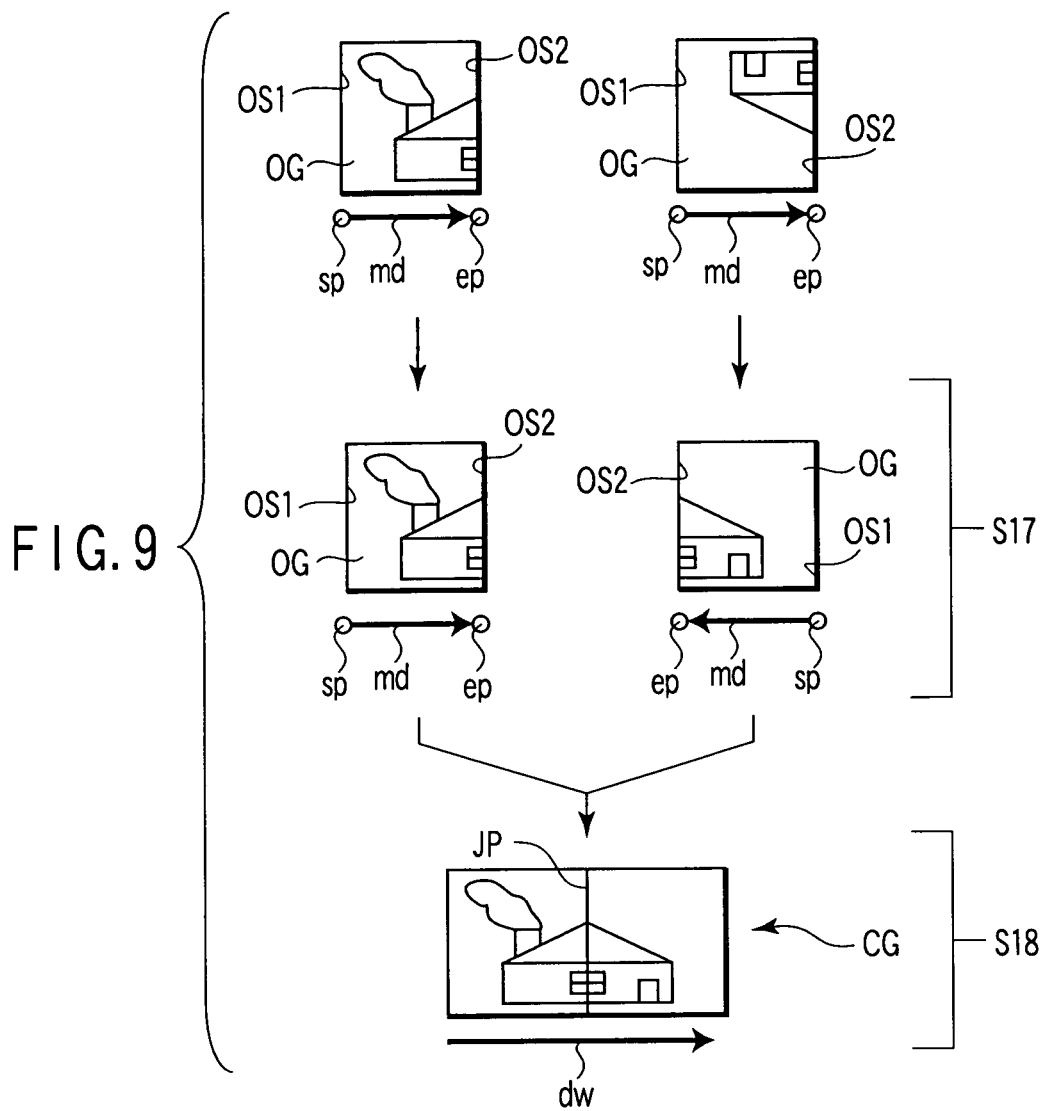
FIG. 9 is a view showing assembling work.

The plurality of output images OG are combined in a predetermined array to form one complete image CG by the following assembling work. FIG. 9 shows the assembling work. In FIG. 9, one end in the width direction of the recording-medium is indicated by a reference code OS1, and the other end is indicated by a reference code OS2. In FIG. 9, a moving direction of the recording-head 20 in the main scanning direction is indicated by an arrow md. A recording-start position of the recording-head 20 in the main scanning direction is indicated by a reference code sp. Similarly, a recording-end position of the recording-head 20 is indicated by a reference code ep.

The left output image OG in FIG. 9 records a divided image SG where width-direction-order-data WD is 1. That is, the left output image OG is a first-recorded output image OG. The right output image OG in FIG. 9 records a divided image OG where width-direction-order-data WD is 2. That is, the right output image OG is a second-recorded output image OG.

In the assembling work, first, step S17 of adjusting a direction of the output image OG is carried out. In step S17, the recording-medium is rotated by 180° to rotate the output image OG which has recorded the rotated divided image in the image recording process by 180°. By the rotation, all the output images OG are unified in direction.

The two output images OG shown in FIG. 9 are recorded by the movement of the recording-head 20 in the direction md. Thus, in both output images, before the execution of step S17, as shown in the uppermost stage of FIG. 9, a portion recorded in the recording-start position SP is on the left of the paper surface, and a portion recorded in the recording-end position ep is on the right side of the paper surface. The right output image OG is rotated in step S17, and the portion recorded in the recording-start position sp is moved to the right. Similarly, the portion recorded in the recording-end position ep is moved to the left. Accordingly, one end OS1 of the recording-medium is moved from left to right, while the other end OS2 is moved from right to left.

Subsequently, step S18 of assembling the output images is carried out. In step S18, first, the output images OG are arrayed in the same manner as that of the corresponding divided-images SG. Specifically, the output images OG are arrayed in the width-arraying direction dw in recording order of the divided-images SG of small width-direction-order-data WD.

Figure 10:
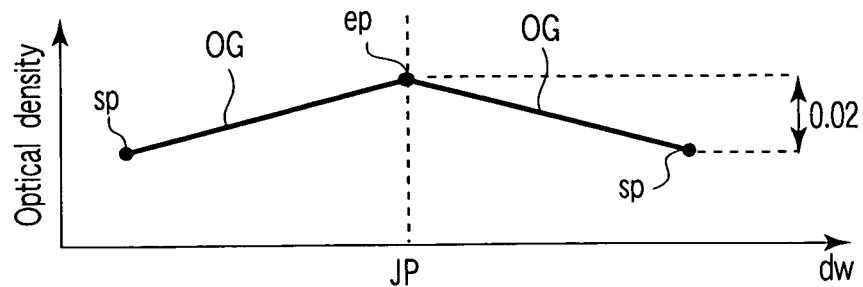
FIG. 10 is a view showing a distribution of an image density of a complete image of the first embodiment.

As described above, in the right output image OG, by the aforementioned rotation, each ink dot constituting the output image OG is rotated by 180° to be moved around a center of gravity of the recording surface of the recording-medium. Thus, as shown in the second stage of FIG. 9, in the right output image OG, the recording-end position ep is moved to the left. Accordingly, in the joined portion JP, portions recorded in the recording-end positions ep of both images are adjacent to each other. As a result, even if ink viscosity is changed due to the movement of the recording-head 20 in the main scanning direction, and a difference is generated in image density between the recording-start positions sp and the recording-end position ep, as shown in FIG. 10, images recorded in a state where ink viscosity is substantially constant can be adjacent to each other in the joined portion JP.

Further, by the aforementioned rotation, the portions recorded in the recording-start position sp and the recording-end position ep of the right output image OG are rotated to be moved so that the position may be switched. Thus, even if there is variance in accuracy during recording by the head-driving-assembly where an image density varies from one end to the other end in the main scanning direction, as shown in the third stage of FIG. 9, images recorded in a substantially equal state of image densities can be adjacent to each other.

In step S17, one end OS1 of the recording-medium on which the right output image OG has been recorded is moved from left to right, while the other end OS2 is moved from right to left. Thus, in the joined portion JP, the other ends OS2 of both recording-media are adjacent to each other. Therefore, even if there is a difference in ink absorption characteristics between one and the other end of each recording-medium, ends substantially similar to each other in characteristics can be adjacent to each other.

Then, an end of each output image OG is connected to an end of an adjacent output image OG. Accordingly, all the output images OG form one complete image.

As described above, the image-recording apparatus 1 records each divided image by reversing the recording direction for every other width-direction-order-data WD. The complete image CG is formed by connecting the plurality of output images unified in direction by rotating the recording-media. Thus, in the joined portion JP of the complete image CG, the end of each output image OG is adjacent to the end of the adjacent output image OG in the same side of the main scanning direction during recording. Accordingly, even if there is an optical density difference (image density difference) and/or a color tone difference between one end and the other end of each output image OG depending on accuracy of the image-recording apparatus and characteristics of the recording-medium, it is possible to remove or reduce a density difference and/or color tone difference in the joined portion JP. Therefore, the image-recording apparatus 1 can output a large image which exceeds the width of the recording-medium, at high recording quality by outputting the plurality of output images OG as described above.

According to the embodiment, in step S12, the even number of width-direction-order-data WD is selected. However, the odd number thereof can be selected.

According to the embodiment, the recording-medium of the rolled shape is used. However, a recording-medium cut before recording can be used. That is, a shape of a recording-medium is optional as long as it has a size within which each divided image can be recorded.

According to the embodiment, an overlap space, which is an overlapped portion can be formed in each output image OG when it is connected with the adjacent output image OG. If there is an overlap space, both images can be aligned more accurately by overlapping the overlap spaces of the output images OG. The overlap space can be cut off after both images are aligned. Additionally, in the image recording process, the width-direction-order-data WD can be recorded on the overlap space. The width-direction-order-data WD is also position information indicating a position of each divided image in the width-arraying direction dw. Thus, if each output image OG has width-direction-order-data WD, it is possible to easily determine which divided image SG has been recoded. Moreover, the width-direction-order-data WD enables easy determination of the arrangement of the output images OG. Therefore, the assembling work can be easily carried out. In the present embodiment, the data-recording region of the recording medium has the same width as the recording medium with RW. Nonetheless, the data-recording region may have a width smaller than the width RW, leaving a margin on either side of the medium.

In the image recording process, an alignment mark can be recorded on a position, which becomes a joined portion. An example of the alignment mark is a cross mark recorded by using black ink or yellow ink. In the case of the cross mark, connection accuracy can be further increased since horizontal and vertical positioning can be easily carried out. It is when an image density around the joined portion of the output images is relatively high, the black ink is used for recording the cross mark. In the case of a relatively low image density or white around the joined portion of the output images, preferably, low-concentration yellow ink is used so as not to be conspicuous.

The embodiment has been described by way of case where the basic image data GD is divided into two images SG. However, the image-recording apparatus 1 of the embodiment enables division into images more than two. In this case, the divided images SG formed at even number are rotated in the image rotation process.

According to the embodiment, the image processing for the basic image data can be carried out based on a program of the computer. Specifically, a program for executing the image size determination process, the image division process and the image rotation process is installed in the computer to enable recording of the formed divided images by the image-recording apparatus.

Second Embodiment

Hereinafter, description will be made of an image-recording apparatus according to a second embodiment. The image-recording apparatus of the embodiment is different from that of the first embodiment in the image division process. Specifically, in the image division process, the image-recording apparatus 1 of the embodiment divides basic image data GD into a predetermined number, and forms divided-images SG. An apparatus constitution etc., are similar to those of the first embodiment.

First, in the image-recording apparatus 1 of the embodiment, in the image input process, a total division number SC that is the predetermined division number is entered in addition to a recording-medium width RW. The total division number CS is optionally set, sent from a computer 50 through an input section 42 to a main CPU 41, and stored in a memory section 43.

In the image division process, an image-processing section 44 divides the basic image data GD into equal width divided-images SG of the total division number SC.

Subsequently, each divided image SG is changed in magnification so that a divided image width SW of predetermined resolution may be equal to the recording-medium width RW. Accordingly, as in the case of the first embodiment, the divided-images SG are subjected to an image rotation process, an image recording process, and image assembling work. Thus, the complete image CG is formed.

By the foregoing constitution, each divided image is changed in magnification to be substantially equal to the width of the recording-medium. Thus, width of each divided image can be surely matched with the width of the recording-medium. Therefore, an image is uniformly recorded on each recording-medium to enable removal of a waste of the recording-medium.

Hereinafter, a modified example of the embodiment will be described.

MODIFIED EXAMPLE 1

As in the case of the foregoing image-recording apparatus 1, an image-recording apparatus 1 of the modified example divides basic image data into a predetermined total division number SG to form divided-images SG uniform in width. However, the image-recording apparatus 1 of the modified example is different from that of the second embodiment in that each divided image SG is recorded without being changed in magnification.

Figure 11:
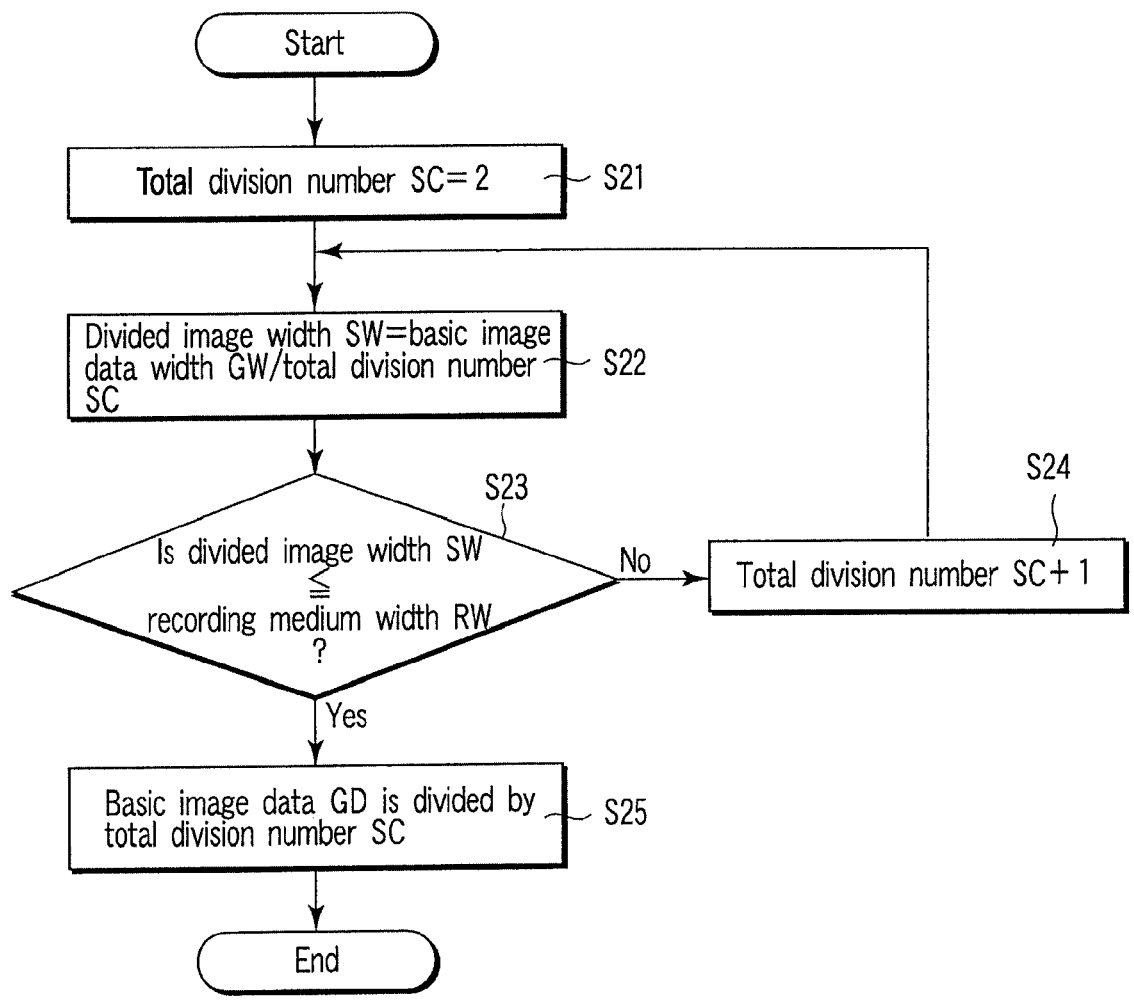
FIG. 11 is a flowchart showing a control procedure in an image division process of a modified example according to a second embodiment.

An image division process of the modified example will be described in detail through the following steps by referring to FIG. 11. FIG. 11 is a flowchart showing a control procedure in the image division process of the modified example.

(Step S21) In step S21, 2 which is a minimum division number is set as a total division number SC. This set total division number SC is stored in a memory section 43. Then, step S22 is carried out.

(Step S22) In step S22, a basic image data width GW is divided by the stored total division number SC to obtain a divided image width SW. The obtained divided image width SW is a width of the divided image SG when equal division is made based on the total division number SC. Then, step S23 is carried out.

(Step S23) In step S23, determination is made as to whether the divided image width SW is not more than a recording-medium width RW or not. If the divided image width SW is larger than the recording-medium width RW, then step S24 is carried out. If the divided image width SW is not more than the recording-medium width RW, then step S25 is carried out.

(Sep S24) In step S24, 1 is added to a value of the total division number SC. After the end of step S24, step S22 is carried out again.

(step S25) In step S25, the basic image data GD is actually divided based on the total division number SC. By this division, a plurality of divided-images SG are formed.

As described above, in step S23, the divided image width SW of the divided image SG divided based on the entered total division number SC is compared in size with the recording-medium with RW. If the divided image width SW is larger than the recording-medium width RW, a value of the total division number is incremented in step S24. Steps S23 to S24 are repeated until the divided image width SW is not more than the recording-medium width RW.

Thus, the image-recording apparatus 1 of the modified example 1 can surely divide the basic image data GD into the divided-images SG which has the width SW not more than the recording-medium width RW.

If it is determined in step S23 that the divided image width SW is larger than the recording-medium width RW, a message for requesting entry of a larger total division number SC may be sent to a user, whereby the total division number SC can be entered again.

In step S21, 2 which is a minimum division number is entered as the total division number SC. That is, the image division process is started from the division of the basic image data GD into two. Accordingly, in the image division process, the basic image data GD can be surely divided into a minimum preferable number so as to remove a waste of the recording-medium.

However, in step S21, the process can be started by entering an optional division number and dividing the basic image data GD based on the entered division number. For example, if 4 is entered as the total division number SC, in step S22, a divided image width SW is obtained when the basic image data GD is uniformly divided into four. Then, the process proceeds to execute each step.

After the end of the image division process, then an image rotation process and an image recording process are carried out. Now, the image rotation process and the image recording process of the modified example will be described by referring to FIG. 12.

Figure 12:
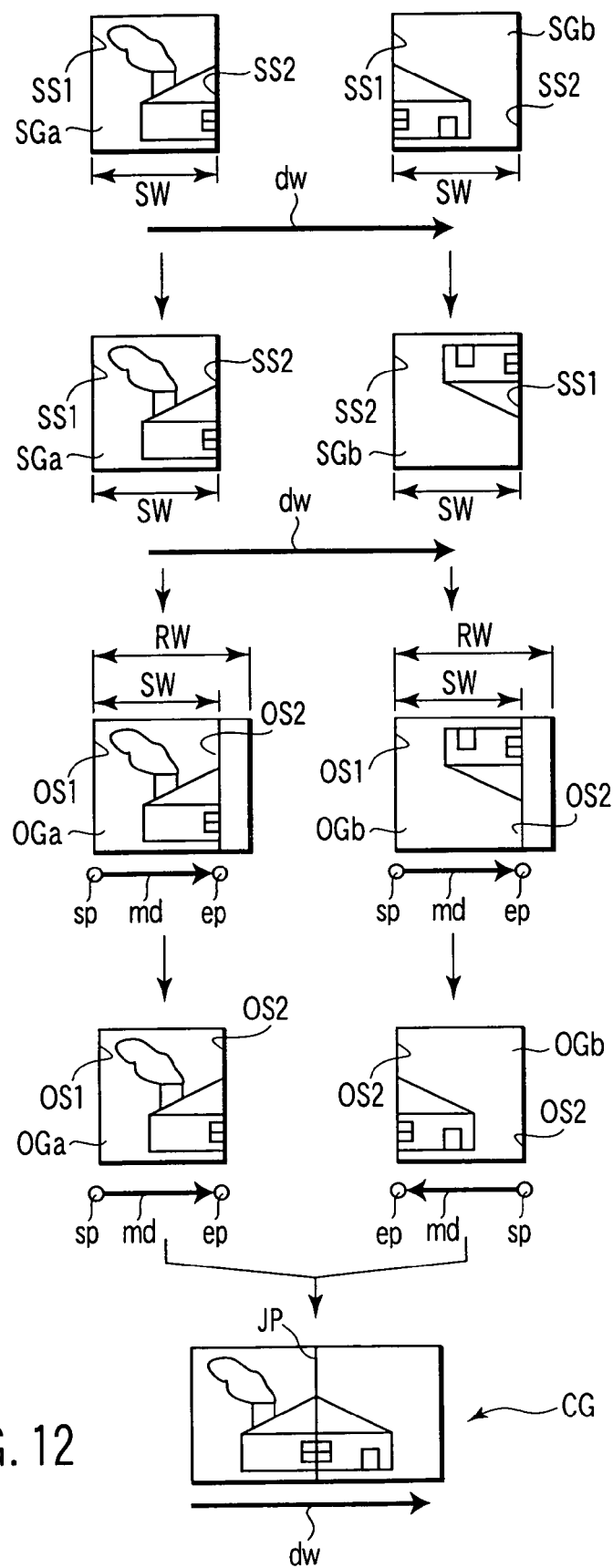
FIG. 12 is a view showing divided images, output images and a complete image formed in the modified example of the second embodiment.

First, the image rotation process is carried out. In the modified example, the image rotation process is similar to that of the first embodiment. The uppermost stage in FIG. 12 shows two divided-images SG before the execution of the image rotation process. To explain, in the uppermost stage of FIG. 12, the left divided image is indicated by a reference code SGa, and the right divided image is indicated by SGb. Each of the divided-images SGa, SGb has one end SS1 and the other end SS2 in the width arraying direction dw. The ends SS1 of both divided-images SGa, SGb are positioned on the same side (left side in FIG. 12).

A second stage in FIG. 12 shows the divided-images SGa, SGb after the image rotation process. In the image rotation process, the divided image SGb is rotated. As a result, as described above with reference to the image rotation process of the first embodiment, one end SS1 and the other end SS2 of the divided image SGb are switched in positions.

Subsequently, the image recording process is carried out. The image recording process of the modified example will be described by referring to FIG. 12. In the image recording process, if the divided image width SW is equal to the recording-medium width RW, the divided image SG is recorded as in the case of the first embodiment.

If the divided image width SW is smaller than the recording-medium width RW, the divided image SG cannot be recorded over the entire width of the recording-medium. That is, both ends of the divided image SG cannot be positioned in both ends of the recording-medium. Thus, the divided-images SG after the image rotation process are recorded so that the ends on the same side in the arraying direction dw may be at one position in the width direction of the recording-medium. Specifically, the divided image SGa not rotated in the image rotation process is recorded so that one end SS1 may coincide with one end in the width direction of the recording-medium. The divided image SGb rotated in the image rotation process is recorded so that the other end SS2 may coincide with one end in the width direction of the recording-medium. Output images OGa, OGb thus recorded are shown in the third stage of FIG. 12.

In the recorded output images OGa, OGb, margins each of which has a width of recording-medium width RW-divided image width SW are formed. After removal of the margins, as in the case of the first embodiment, the output images OGa, OGb are subjected to assembling work (see fourth stage and lowermost stage in FIG. 12).

The divided-images SGa, SGb after the image rotation process are recorded on the recording-media in the arraying direction dw so that the end on the same side may be recorded on the same side of the recording-medium. Then the recording-media that recorded the output images OGa, OGb is joined. Accordingly, in a joined portion JP of the joined recording-media, each of portions at the divided image width SW from one end of the divided image width SW is joined to another in the width direction. That is, the recording-media where the adjacent output images OGa, OGb are recorded are joined together at one position in the width direction.

Therefore, even in the case of the output images not recorded over the entire recording-medium width RW, the image-recording apparatus 1 of the modified example can always form a complete image CG by joining the portions of the recording-media in the same position in the width direction. As a result, even if there is a difference in ink absorption characteristics in the width direction between the recording-media, it is possible to place ends substantially similar in characteristics adjacently to each other.

Third Embodiment

Hereinafter, description will be made of an image-recording apparatus 1 according to a third embodiment. The image-recording apparatus 1 of the embodiment is different from that of the second embodiment in that it has recording-medium supply assembly for selectively supplying a plurality of recording-media different in recording-medium width RW. Apparatus components etc. other than the recording-medium supply assembly are similar to those of the first embodiment.

The recording-medium supply assembly is a well-known paper feeding device, which is connected to a control section 40. The recording-medium supply assembly supplies a recording-medium having a recording-medium width RW selected by the control section 40 to image recording assembly 60. Now, description will be made of a case where the recording-medium supply assembly of the embodiment has three kinds of recording-media of widths equal to general sheet widths A0, A1, A2. To explain, it is assumed that the recording-medium A0 has a recording-medium width RW0. Similarly, it is assumed that the recording-medium A1 has a recording-medium width RW1, and the recording-medium A2 has a recording-medium width RW2.

Figure 13:
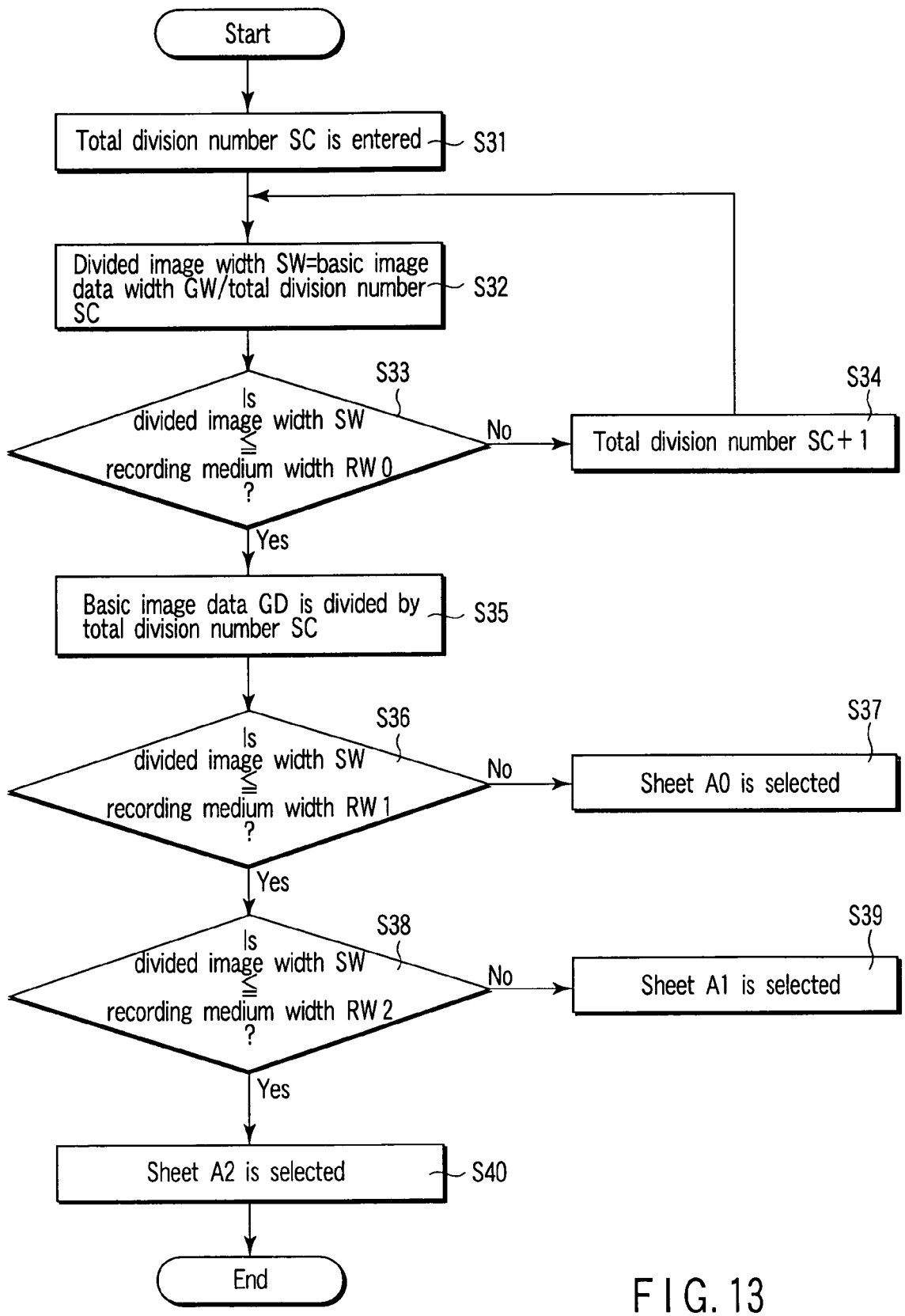
FIG. 13 is a flowchart showing a control procedure in an image division process according to a third embodiment.

The image-recording apparatus 1 of the embodiment is controlled, and records images as in the case of the second embodiment. However, an image division process is different from that of the second embodiment. The image division process of the embodiment will be described in detail through the following steps by referring to FIG. 13. FIG. 13 is a flowchart showing a control procedure in the modified example.

(Step S31) In step S31, an optional total division number SC is entered. This entered total division number SC is stored in a memory section 43. Then, step S32 is carried out.

(Step S32) In step S32, a basic image data width GW is divided by the entered total division number SC to obtain a divided image width SW. The obtained divided image width SW is a width of the divided image SG when equal division is made based on the total division number SC. Then, step S33 is carried out.

(Step S33) In step S33, determination is made as to whether the divided image width SW is not more than a recording-medium width RW0 largest in recording-media of the recording-medium supply assembly or not. That is, determination is made as to whether the divided image SW is not more than the recording-medium width RW0 of the recording-medium A0 or not. If the divided image width SW is larger than the recording-medium width RW0, then step S34 is carried out. If the divided image width SW is not more than the recording-medium width RW0, then step S35 is carried out.

(Sep S34) In step S34, 1 is added to a value of the total division number SC. After the end of step S34, step S32 is carried out again.

(step S35) In step S35, the basic image data GD is actually divided based on the total division number SC. By this division, a plurality of divided-images SG are formed.

(Step S36) In step S36, determination is made as to whether the divided image width SW is not more than a second largest recording-medium width RW1 in the recording-media of the recording-medium supply assembly or not. That is, determination is made as to whether the divided image SW is not more than the recording-medium width RW1 of the recording-medium A1 or not. If the determination shows that the divided image width SW is larger than the recording-medium width RW1, in combination with the determination of step S33, it can be understood that the divided image SG has a width SW which disables recording on the recording-media A1 and A2, but which enables recording on the recording-medium A0.

If the divided image width SW is larger than the recording-medium width RW1, then step S37 is carried out. If the divided image width SW is not more than the recording-medium width RW0, then step S38 is carried out.

(Step S37) In step S37, based on the determination of step S36, the recording-medium supply assembly supplies the recording-medium A0 to the image recording assembly 60.

(Step S38) In step S38, determination is made as to whether the divided image width SW is not more than a recording-medium width RW2 smallest in the recording-media of the recording-medium supply assembly or not. That is, determination is made as to whether the divided image SW is not more than the recording-medium width RW2 of the recording-medium A2 or not. If the determination shows that the divided image width SW is larger than the recording-medium width RW2, in combination with the determinations of steps S33, S36, it can be understood that the divided image width SW is close to the recording-medium width RW1 among the recording-medium widths RW0, 1, 2 of the three kinds of recording-media. If it is determined that the divided image width SW is not more than the recording-medium width RW2, it can be understood that the divided image width SW is close to the recording-medium width RW2 among the recording-medium widths RW0, 1, 2 of the three kinds of recording-media.

Thus, if the divided image width SW is larger than the recording-medium width RW1, then step S39 is carried out. If the divided image width SW is smaller than the recording-medium width RW0, then step S40 is carried out.

(Step S39) In step S39, based on the determination of step S38, the recording-medium supply assembly supplies the recording-medium A1 to the image recording assembly 60.

(Step S40) In step S40, based on the determination of step S38, the recording-medium supply assembly supplies the recording-medium A2 to the image recording assembly 60.

After the division of the basic image data GD and the supplying of the recording-medium to be used for recording to the image recording assembly 60, the image-recording apparatus of the embodiment carries out an image recording process similar to that of the first embodiment for the supplied recording-medium. Then, assembling work is carried out to form a complete image CG.

Thus, as in the case of the second embodiment, the image-recording apparatus 1 of the embodiment can divide the basic image data GD based on a desired image division number. Additionally, as in the case of the modified example of the second embodiment, the image-recording apparatus 1 of the embodiment can surely divide the basic image data GD into divided-images SG of widths smaller than the recording-medium width RW.

Furthermore, the image-recording apparatus 1 of the embodiment selects the recording-medium having a recording-medium width RW close to the divided image width SW, and records the divided image thereon. Thus, the image-recording apparatus 1 of the embodiment can reduce margins of each recording-medium on which the image is not recorded to remove wastes.

Fourth Embodiment

Next, description will be made of an image-recording apparatus according to a fourth embodiment. The image-recording apparatus 1 of the embodiment outputs an even number of output images OG. Thus, an image division process of the embodiment is different from that of the first embodiment, and apparatus components etc. are similar to those of the first embodiment.

Figure 14:
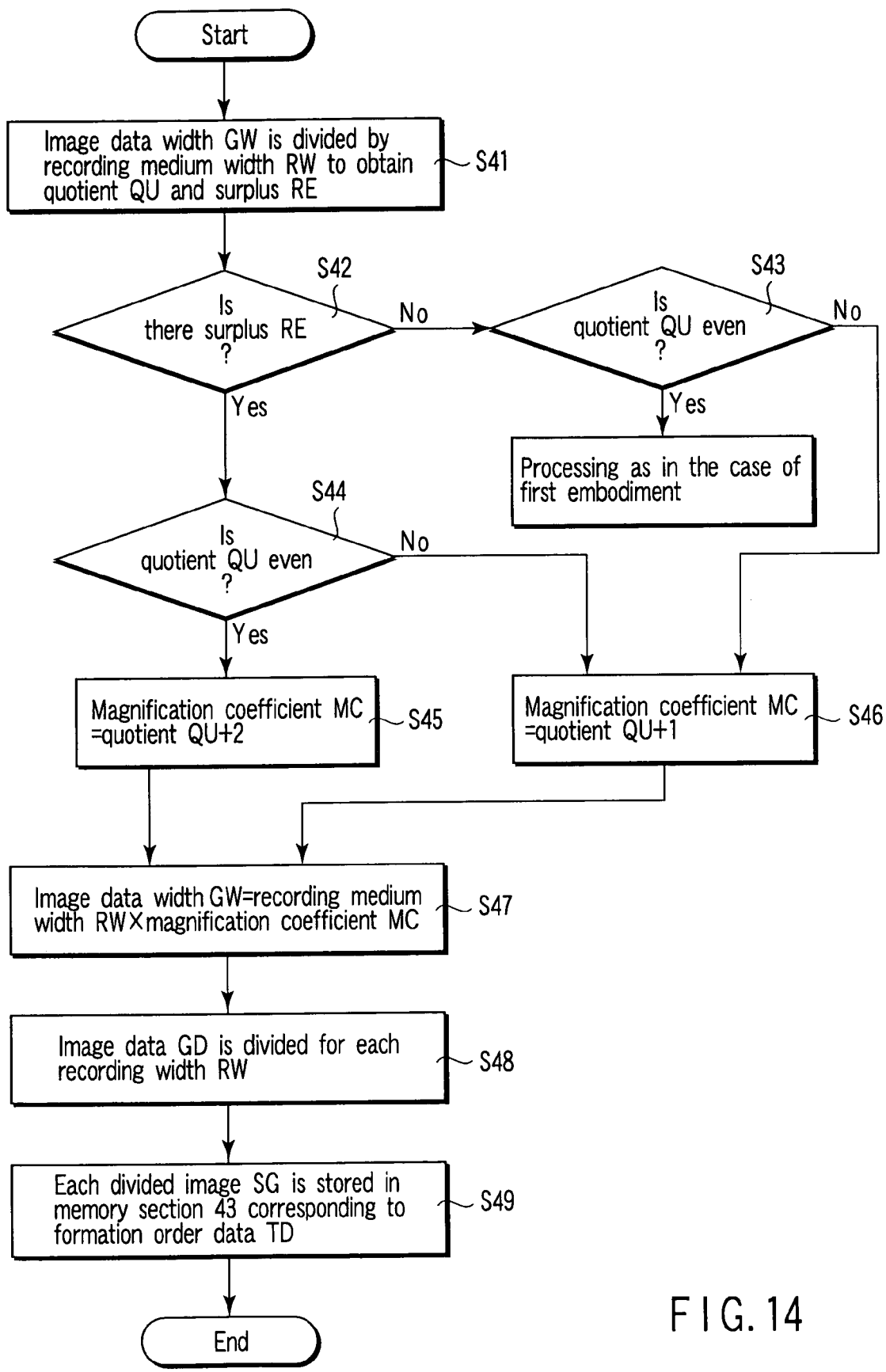
FIG. 14 is a flowchart showing a control procedure in an image division process according to a fourth embodiment.

Hereinafter, the image division process will be described by referring to FIG. 14. FIG. 14 is a flowchart showing a control procedure in the image division process of the embodiment. The image-recording apparatus 1 of the embodiment carries out a plurality of steps described below.

(Step S41) First, step S41 is carried out. In step S41, a basic image data width GW is divided by a recording-medium width RW. Thereby a quotient QU and a surplus RE is obtain by the dividing. Then, step S42 is carried out.

(Step S42) In step S42, investigation is made as to whether there is a surplus RE or not in the solution of dividing the basic image data width GW by the recording-medium width RW. If there is no surplus RE, then step S43 is carried out. If there is a surplus RE, then step S44 is carried out.

(Step S43) In step S43, investigation is made as to whether the quotient QU is even or not when there is no surplus RE. If the quotient QU is even, the basic image data width GW is an even multiple of the recording-medium width RW. In this case, the basic image data GD is subjected to an image division process as in the case of the first embodiment.

If the quotient QU is odd, step S46 is carried out.

(Step S44) In step S44, investigation is made as to whether the quotient QU is even or not when there is a surplus RE. If it is an even multiple, then step S45 is carried out. If it is an odd multiple, then step S46 is carried out.

(Step S45) In step S45, a value obtained by adding 2 to the quotient QU is stored as a magnification coefficient MC in a memory section 43. Thus, since 2 is added to the even quotient, an even magnification coefficient MC is formed. Then, step S47 is carried out.

(Step S46) In step S46, a value obtained by adding 1 to the quotient QU is stored as a magnification coefficient MC in the memory section 43. Thus, since 1 is added to the odd quotient, an even magnification coefficient MC is formed. Then, step S47 is carried out.

(Step S47) In step S47, the basic image data GD is enlarged so that the basic image data width GW may take a value obtained by multiplying the magnification coefficient MC by the recording-medium width RW. In steps S45 and S46, the magnification coefficient MC has been set even. Thus, the basic image data width GW is surely set to be an even multiple of the recording-medium width RW. Then, step S48 is carried out.

(Step S48) In step S48, as in the case of the first embodiment, the basic image data GD is divided in its own width direction for each recording-medium width RW.

(Step S49) In step S49, each divided image SG is stored together with width-direction-order-data WD in the memory section 43.

Thus, the image division process is finished. Subsequently, the image-recording apparatus 1 of the embodiment outputs each divided image SG as in the case of the first embodiment. Then, the outputted images OG are subjected to assembling work similar to that of the first embodiment to form a complete image CG.

Figure 15:
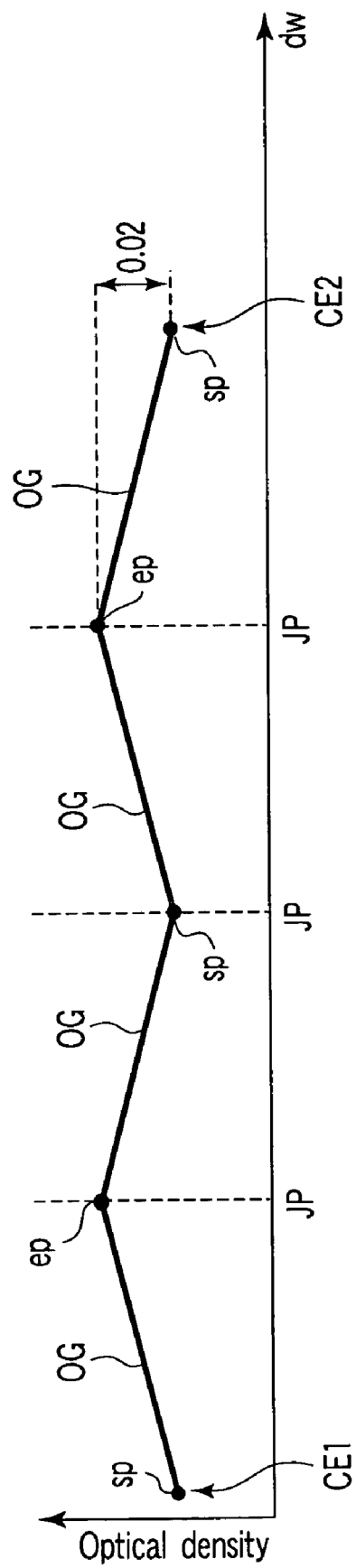
FIG. 15 is a view showing a distribution of an image density of a complete image of the fourth embodiment.

As described above, before the division, the image-recording apparatus 1 of the embodiment enlarges the basic image data width GW of the basic image data GD to an even multiple of the recording-medium width RW. Thus, the image-recording apparatus 1 of the embodiment can surely divide the basic image data GD into an even number of images SG. If the number of divided-images SG is even, the divided image SG positioned in the other end of the width direction of the complete image CG becomes an image rotated by 180°. In other words, the divided image SG of the other end is directed to be opposite the divided image SG positioned in one end of the width direction. Thus, if one end and the other end of the width direction of the complete image CG are connected to form a cylindrical complete image CG, portions of recording-media substantially in similar states are adjacent to each other in a joined portion JP of one end and the other end of the with direction of the complete image CG. Accordingly, in the joined portion JP of one end and the other end of the complete image CG, images recorded in substantially similar positions are adjacent to each other in a main scanning direction. As shown in FIG. 15, image densities at one end CE1 and the other end CE2 are substantially equal. FIG. 15 shows an image density of each position in an arraying direction when in a magnification coefficient MC is 4, four recorded output images OG are arrayed in a width-arraying direction dw. In FIG. 15, one end of the width direction of the complete image CG is indicated by a reference code CE1, and the other end is indicated by a reference code CE2.

As described above, the image-recording apparatus 1 of the embodiment can output the images OG so that image densities may become substantially equal in the joined portion JP of one end and the other end of the complete image CG. Thus, the image-recording apparatus 1 of the embodiment can output high-quality images even when an annular complete image is formed.

Furthermore, since the basic image data width GW is set to be an even multiple of the recording-medium width RW, the image-recording apparatus 1 of the embodiment can surely match the divided image width SW with the recording-medium width RW. Thus, the image-recording apparatus 1 of the embodiment can carry out recording on the entire recording-medium without any wastes.

Figure 16:
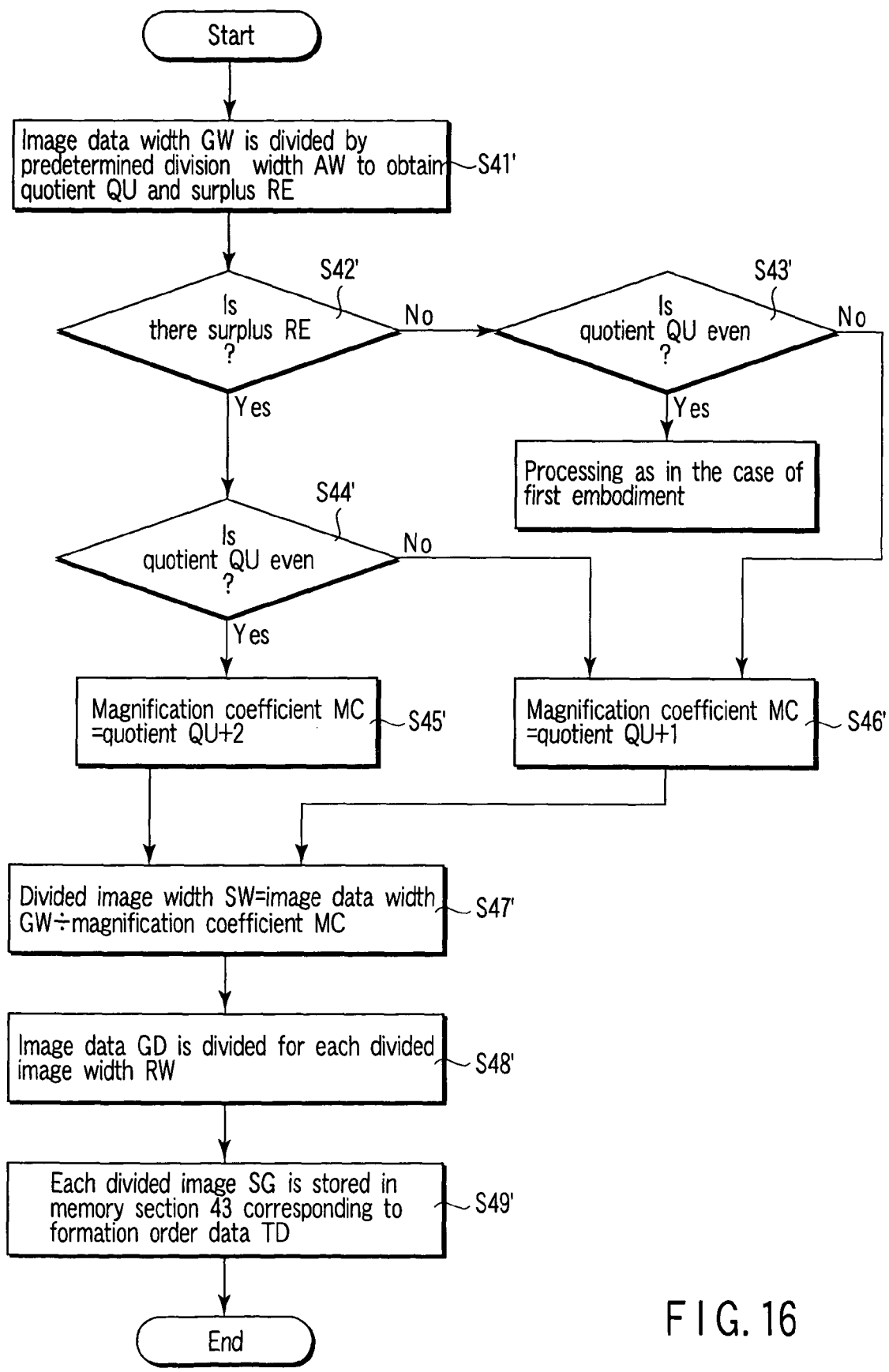
FIG. 16 is a flowchart showing a control procedure in an image division process of a modified example of the fourth embodiment.

According to the embodiment, the recording-medium width (divided image width) is fixed, and the basic image data width GW of the basic image data GD is changed in accordance with this width. However, the basic image data width GW is fixed, and the divided image width may be changed in accordance with this width. Hereinafter, a modified example of the image division process will be described by referring to FIG. 16.

Modified Example 1

In the image division process of the modified example 1, a plurality of following steps are carried out.

(Step S41') In this image division process, first, step S41' is carried out. In step S41', a basic image data width GW is divided by a predetermined division width (smaller than recording-medium width RW) to obtain a quotient QU and a surplus RE. Then, step S42' is carried out.

(Step S42') In step S42', investigation is made as to whether there is a surplus RE or not in the solution of dividing the basic image data width GW by the predetermined division with AW. If there is no surplus RE, then step S43' is carried out. If there is a surplus RE, then step S44' is carried out.

(Step S43') In step S43', investigation is made as to whether the quotient QU is even or not when there is no surplus RE. If the quotient QU is even, the basic image data width GW is an even multiple of the recording-medium width RW. In this case, the basic image data GD is subjected to an image division process as in the case of the first embodiment.

If the quotient QU is odd, step S46' is carried out.

(Step S44') In step S44', investigation is made as to whether the quotient QU is even or not when there is a surplus RE. If it is an even multiple, then step S45' is carried out. If it is an odd multiple, then step S46' is carried out.

(Step S45') In step S45', a value obtained by adding 2 to the quotient QU is stored as a magnification coefficient MC in a memory section 43. Thus, since 2 is added to the even quotient, an even magnification coefficient MC is formed. Then, step S47' is carried out.

(Step S46') In step S46, a value obtained by adding 1 to the quotient QU is stored as a magnification coefficient MC in the memory section 43. Thus, since 1 is added to the odd quotient, an even magnification coefficient MC is formed. Then, step S47' is carried out.

(Step S47') In step S47', the basic image data width GW is divided by the magnification coefficient MC to obtain a new divided image width SW. In steps S45' and S46', the magnification coefficient MC has been set even. Thus, the basic image data width GW is surely set to a size, which enables division of the basic image data GD into an even multiple.

(Step S48') In step S48', the basic image data GD is divided in a width direction for each divided image width SW obtained in step S47'. Then, step S49' is carried out.

(Step S49') In step S49', each divided image SG is stored together with width-direction-order-data WD in the memory section 43.

Thus, the image division process is finished. Subsequently, the image-recording apparatus 1 of the embodiment outputs each divided image SG as in the case of the first embodiment. Then, the outputted images SG are subjected to assembling work similar to that of the first embodiment to form a complete image CG.

Therefore, since the basic image data GD can be divided into an even number, the image-recording apparatus 1 of the modified example can output high-quality images even when an annular complete image is formed.

Fifth Embodiment

Hereinafter, an image-recording apparatus according to a fifth embodiment will be described. The image-recording apparatus 1 of the embodiment outputs an even number of images OG. Thus, an image division process of the embodiment is different from that of the fourth embodiment. Apparatus components etc. are similar to those of the first embodiment.

In the image-recording apparatus of the embodiment, the image division process is different from that of the fourth embodiment when a basic image data width GW is an odd multiple of a recording-medium width RW. Hereinafter, description will be made of a case where the basic image data width GW is three times as large as the recording-medium width RW. First, as in the case of step S41, the basic image data width GW is divided by the recording-medium width RW. Thereby a quotient QU and a surplus RE is obtained by the dividing solution. In the embodiment, since the basic image data width GW is three times as large as the recording-medium width RW, the quotient QU is 3, but there is no surplus RE.

In this case, a divided image SG having a width half of the recording-medium width RW is formed from one end of basic image data GD in a width direction. Subsequently, two divided images each having a width half of the recording-medium width RW are formed. Then, a remaining divided image having a width half of the recording-medium width RW is formed. That is, a divided image of a width half of the recording-medium width RW is formed from one end of the basic image data GD, and a divided image SG of a width half of the recording-medium width RW is formed from the other end of the basic image data GD. And, remain part of the basic image data GD is divided by the recording-medium width RW. Thus, an even number of divided-images SG can be surely formed. The divided images half of the recording-medium width RW is recorded so that each portions of the recording-media in the same position in the width direction may be adjacent to the adjacent recording-medium in a joined portion JP during the assembling process as described above with reference to the modified example of the second embodiment. Specifically, each divided images half of the recording-medium width RW is recorded substantially from the center of the recording-medium in the width direction.

Figure 17:
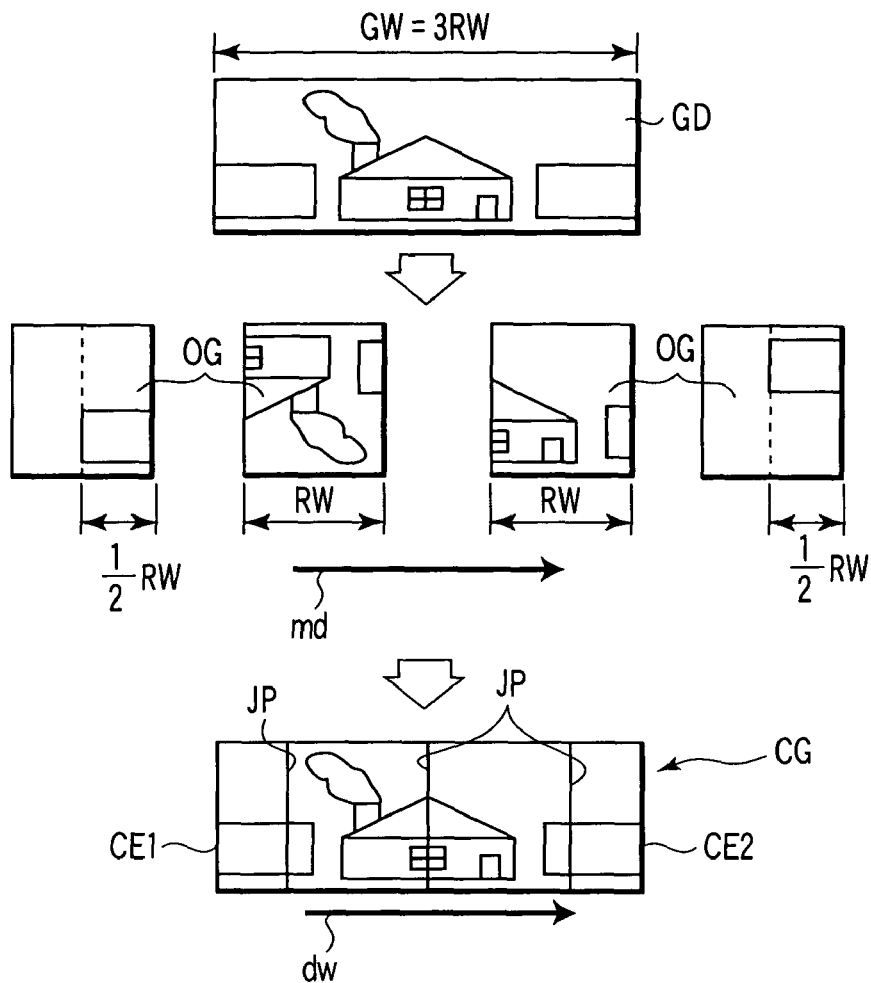
FIG. 17 is a view showing output images and a complete image formed according to a fifth embodiment.

Each output image OG where the divided image SG has been recorded is as shown in FIG. 17. The output image OG of FIG. 17 is shown so that a moving direction md of a recording-head may be directed in the same direction during recording. The each output images where the divided images half in width is connected to the other output image OG after a portion of no recorded image is cut off.

Figure 18:
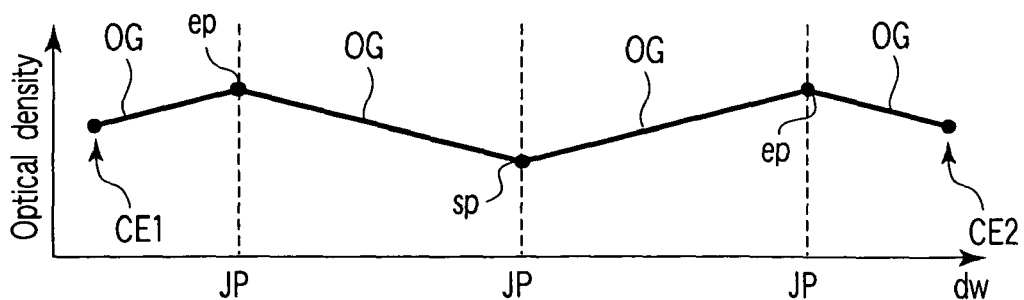
FIG. 18 is a view showing a distribution of an image density of the complete image of the fifth embodiment.

FIG. 18 shows an image density at each position when the output images OG are arrayed in the width-arraying direction dw. Thus, even if one basic image data GD is divided and outputted, portions of recording-media substantially in similar states are adjacent to each other in a joined portion of one end CE1 and the other end CE2 of the width direction of the complete image CG. Accordingly, in the joined portion of one end CE1 and the other end CE2 of the width direction of the complete image CG, images recorded substantially in the same position are adjacent to each other in the main scanning direction. Thus, the image-recording apparatus 1 of the embodiment can output the output image OG so that substantially equal image densities and/or color tones may be set in the joined portion of one end CE1 and the other end CE2 of the complete image CG. As a result, the image-recording apparatus 1 of the embodiment can output high-quality images even if an annular complete image is formed.

The embodiment has been described by way of division of the basic image data GD that has the basic image data width GW three times as large as the recording-medium width RW. However, the image-recording device 1 of the embodiment can divide basic image data GD that has a basic image data width GW of a non-integral multiple of the recording-medium width RW. In this case, divided-images SG in each of which a value obtained by dividing a surplus RE by 2 is set as a divided image width SW are formed in one end and the other end. Specifically, if the basic image data with GW is 2.6 times as large as the recording-medium width RW, a divided image SG having a width SW 0.3 times as large as the recording-medium width RW is formed from each of one end and the other end of the basic image data GD. The divide image SG formed in this manner is adjusted, and recorded on the recording-medium as described above. By such recording, even if the basic image data GD having the basic image data width GW of a non-integral multiple of the recording-medium width RW is divided, the image-recording apparatus 1 of the embodiment can output the output image OG so that substantially equal image densities and/or color tones may be set in the joined portion of one end CE1 and the other end CE2 of the complete image CG.

Sixth Embodiment

Hereinafter, an image-recording apparatus according to a sixth embodiment will be described. The image-recording apparatus 1 of the embodiment outputs an even number of images OG. An image division process in the embodiment is different from that of the fifth embodiment. Apparatus components etc. are similar to those of the first embodiment.

In the image-recording apparatus of the embodiment, the image division process is different from that of the fifth embodiment when a basic image data width GW is an odd multiple of a recording-medium width RW. Hereinafter, description will be made of a case where the basic image data width GW is three times as large as the recording-medium width RW. First, as in the case of step S41, the basic image data width GW is divided by the recording-medium width RW. Thereby, a quotient QU and a surplus RE is obtain by the dividing solution. According to the embodiment, since the basic image data width GW is three times as large as the recording-medium width RW, the quotient QU is 3, but there is no surplus RE.

In this case, a divided image SG having a width equal to the recording-medium width RW is formed from one end of basic image data GD in a width direction. Subsequently, three divided-images SG are formed. The divided image SG of the end in the width direction of the basic image data GD is divided by half from the center in the width direction. Thus, an even number of divided-images SG can be surely formed. Each of the two divided images of widths half of the recording-medium width RW is recorded from one end of each recording-medium. The output images OG where the divided images of half widths have been recorded is connected to the other output image OG after a portion of no recorded image is cut off.

Figure 19:
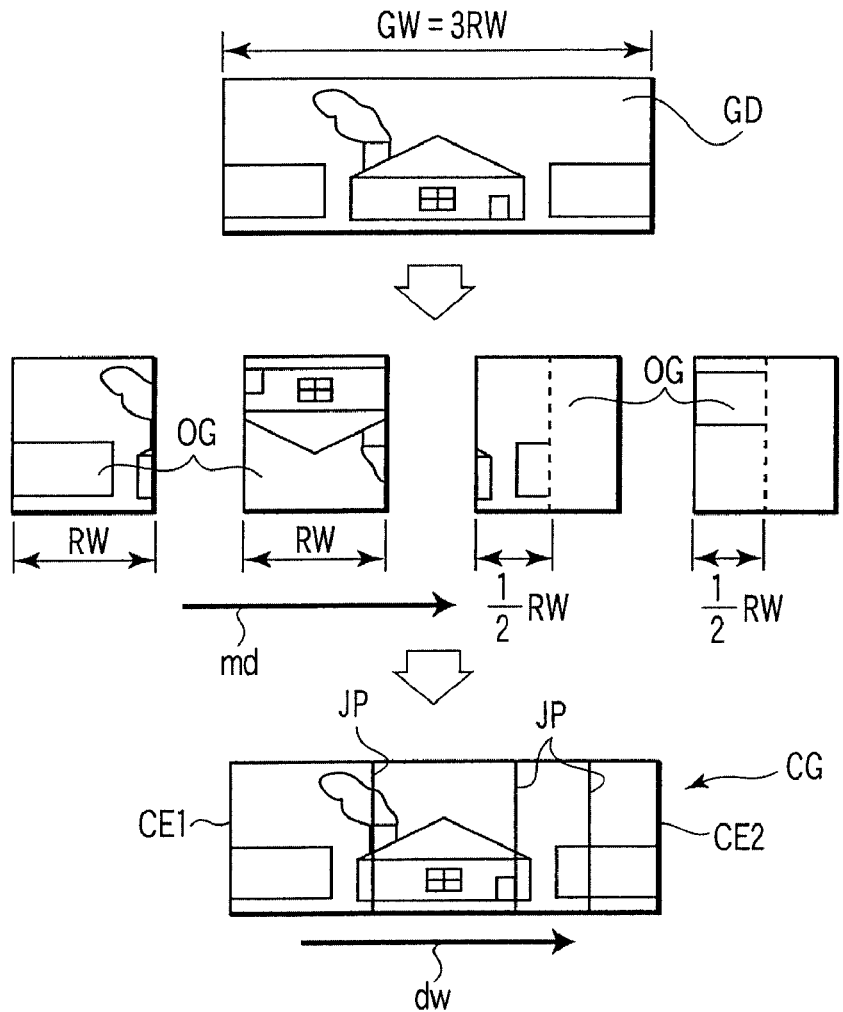
FIG. 19 is a view showing output images and a complete image formed according to a sixth embodiment.
Figure 20:
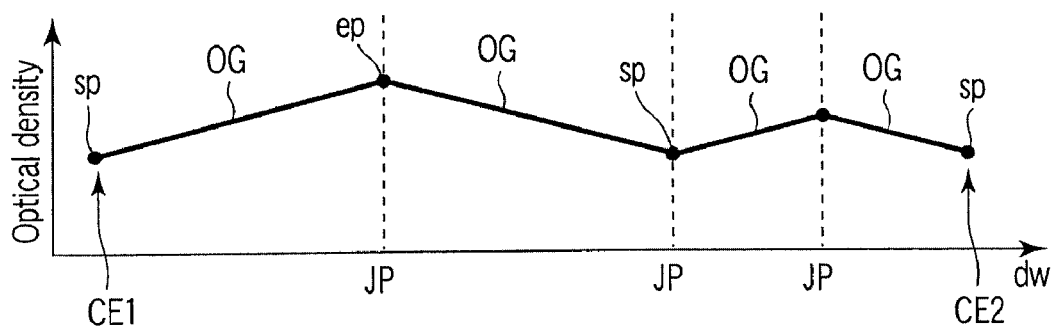
FIG. 20 is a view showing a distribution of an image density of the complete image of the sixth embodiment.

Each output images OG is as shown in FIG. 19. FIG. 20 shows an image density at each position when the output images OG are arrayed in the width-arraying direction dw. Thus, even if one basic image data GD is divided and outputted, portions of recording-media substantially in similar states are adjacent to each other in a joined portion of one end CE1 and the other end CE2 of the width direction of the complete image CG. Accordingly, in the joined portion of one end CE1 and the other end CE2 of the complete image CG, images recorded substantially in the same position are adjacent to each other in the main scanning direction. Thus, the image-recording apparatus 1 of the embodiment can output the output image OG so that substantially equal image densities and/or color tones may be set in the joined portion of one end CE1 and the other end CE2 of the complete image CG. As a result, the image-recording apparatus 1 of the embodiment can output high-quality images even if an annular complete image is formed. Needless to say, in the image-recording apparatus of the embodiment, the basic image data width GW may be divided into an even number of vided images so that a width of the divided image SG may become smaller than the recording-medium width RW.

The embodiment has been described by way of division of the basic image data GD that has the basic image data width GW three times as large as the recording-medium width RW. However, the image-recording device 1 of the embodiment can divide basic image data GD that has a basic image data width GW of a non-integral multiple of the recording-medium width RW. For example, if the basic image data with GW is 2.6 times as large as the recording-medium width RW, two divided-images SG each having a width SW equal to the recording-medium width RW is formed from one end in the width direction of the basic image data GD in the arraying direction dw, and a divided image having a width SW 0.6 times as large as the recording-medium width RW is formed to be narrow in the width direction. Then, the divided image SG narrow in the width direction is divided from the center in the width direction to form two vided images SG each having a divided image width 0.3 times as large as the recording-medium width RW. The divide image SG formed in this manner is adjusted, and recorded on the recording-medium as described above. By such recording, even if the basic image data GD having the basic image data width GW of a non-integral multiple of the recording-medium width RW is divided, the image-recording apparatus 1 of the embodiment can output the output image OG so that substantially equal image densities and/or color tones may be set in the joined portion of one end CE1 and the other end CE2 of the complete image CG.

Furthermore, according to the embodiment, the divided image SG of the other end is divided in the width direction of the basic image data. However, the divided image SG of one end can be divided into two, and a divided image of the center can be divided into two. Thus, if the number of divided images can be even, positions of the divided-images SG in the arraying direction can be optimally set.

Seventh Embodiment

Next, description will be made of an image-recording apparatus of a seventh embodiment. The image-recording apparatus 1 of the embodiment divides basic image data GD not only in a width direction but also in a direction orthogonal to the width direction. Thus, in the embodiment, processes from the image input process to the image recording process is different from the first embodiment, but apparatus components etc. are similar to those of the first embodiment.

[Image Input Process] First, in the image-recording apparatus 1 of the embodiment, a recording-medium length RL is entered in addition to a recording-medium width RW. This recording-medium length RL is a size in a direction orthogonal to a width of a recording-medium used when a divided image SG is recorded. The recording-medium length RL is optionally set is entered from a computer 50 through an input section 42 to a main CPU 41. The main CPU 41 reads an image data length GL which is a length (size in a direction orthogonal to the width) of basic image data GD, and a basic image data width GW, and stores them in the memory section 43. After the end of the image input process, an image size determination process is carried out.

[Image Size Determination Process] In the image size determination process of the embodiment, the image data width GL is compared with the recording-medium length RL. Then, the result is stored in the memory section 43. After the end of the image size determination process, an image division process is carried out.

[Image Division Process] The image division process of the embodiment will be described below. First, description will be made of a case where the main CPU 41 determines that the image data length GL is smaller than the recording-medium length RL.

Upon such determination, the main CPU 41 compares the basic image data width GW with the recording-medium width RW in size. Then, the main CPU 41 carries out different processing based on the comparison result of the basic image data width GW and the recording-medium width RW.

If the basic image data width GW is equal or slightly smaller than the recording-medium width RW, it can be understood that the basic image data GD has a size to be recorded on one recording-medium. Thus, the basic image data GD is directly recorded on one recording-medium by image recording assembly 60.

If the basic image data width GW is larger than the recording-medium width RW, the basic image data GD is divided as in the case of the first embodiment.

Next, description will be made of a case where the main CPU 41 determines in the image size determination process that the image data length GL is larger than the recording-medium length RL. In this case, the basic image data GD is divided in a direction (longitudinal direction) orthogonal to its own width direction in order from one end for each recording-medium length RL. By this division, a plurality of intermediate images MG are formed.

Figure 21:
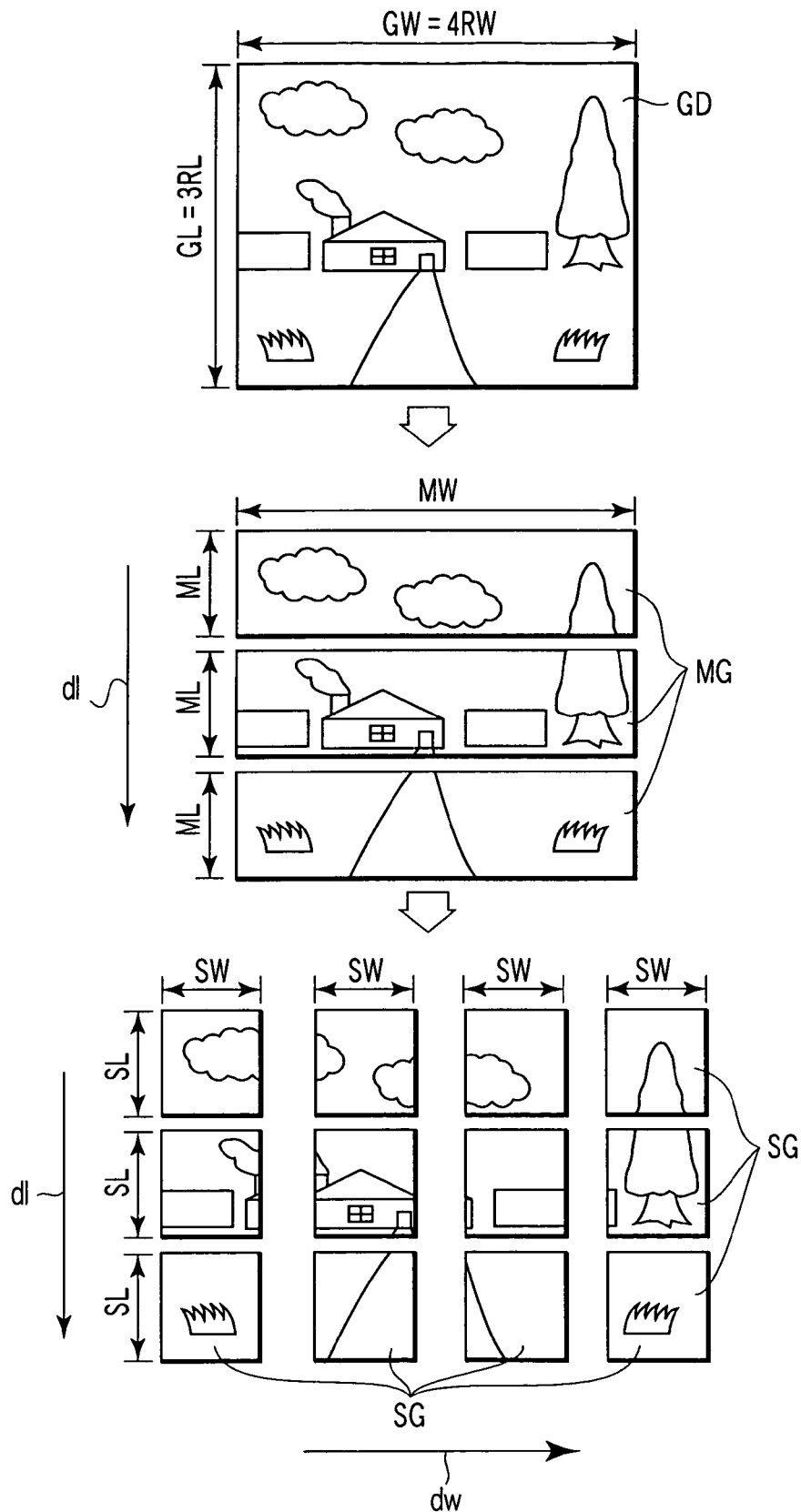
FIG. 21 is a view showing an intermediate image and divided images formed according to a seventh embodiment.

For example, if the basic image data GD has a size shown in FIG. 21, the intermediate image MG is formed as follows. In the basic image data GD shown in upper stage of FIG. 21, a basic image data width GW has a size four times as large as the recording-medium width RW, and an image data length GL has a size three times as large as the recording-medium length RL. The intermediate image MG is divided into three images MG by dividing the basic image data GD in the longitudinal direction as described above. That is, the basic image data GD is divided so that the intermediate images MG may be arrayed in the longitudinal direction. Thus, an arraying direction of the intermediate images MG is set as a longitudinal-arraying direction, which is indicated by a reference code d1 in FIG. 21.

As described above, each intermediate image MG is formed by dividing the image data in order from one end of the longitudinal direction of the basic image data GD. Each divided image SG is a part of the basic image data GD divided to be extended in the width direction. Accordingly, the intermediate images MG are separated from the first-formed intermediated image MG in the formation order in the longitudinal direction of the basic image data GD. It can be said therefore that the arrangement of the intermediate images MG in the longitudinal direction corresponds to the formation order.

Thus, after the division of the basic image data GD in the longitudinal direction, the main CPU 41 stores the formation order of the intermediate images MG as longitudinal-direction-order-data LD in the memory section 43. Accordingly, the main CPU 41 stores the intermediate images MG in the memory section 43 corresponding to the longitudinal-direction-order-data LD.

Then, the main CPU 41 reads an intermediate image width MW that is a width of each intermediate image MG therefrom, and stores it in the memory section 43 corresponding to the longitudinal-direction-order-data LD.

Subsequently, the main CPU 41 compares the intermediate image width MW with the recording-medium width RW in size. Then, the main CPU 41 carries out different processing based on the comparison result of the intermediate image width MW and the recording-medium width RW.

If the intermediate image width MW is not more than the recording-medium width RW, it can be understood that the intermediate image MG has a size to be recorded on one recording-medium. Thus, the intermediate image MG is directly recorded on one recording-medium by the image recording assembly 60.

If the intermediate image width MW is larger than the recording-medium width RW, the intermediate image MG is divided in order from one end in the width direction as in the case of the division of the basic image data GD in the first embodiment. That is, each intermediate image MG is divided so that the divided-images SG may be arrayed in the width direction SG. Thus, an arraying direction of the divided-images SG is set as a width-arraying direction, which is indicated by a reference code dw in FIG. 21.

After the division of the intermediate image MG, the main CPU 41 stores the formation order of the divided-images SG as width-direction-order-data in the memory section 43. The width-direction-order-data WD of the embodiment is a formation order of divided-images SG for each intermediate image MG. Accordingly, the width-direction-order-data WD is stored in the memory section 43 corresponding to each longitudinal-direction-order-data LD. After the end of the image division process, then an image rotation process is carried out.

Figure 22:
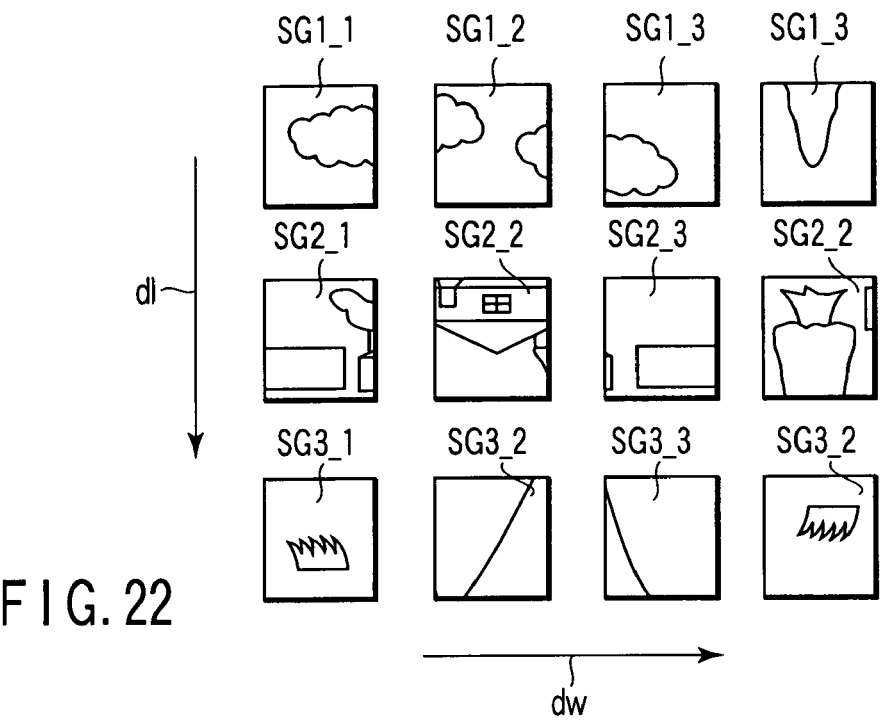
FIG. 22 is a view showing divided images after an image rotation process, the images being formed according to the seventh embodiment.

[Image Rotation Process] In the image rotation process of the embodiment, for each longitudinal-direction-order-data corresponding to each intermediate image MG, as in the case of the first embodiment, image processing is carried out for the divided-images SG in the width-direction-order-data WD. Specifically, for each longitudinal-direction-order-data LD, the divided image SG where width-direction-order-data WD is even is rotated by 180°. Because of such rotation of the divided images SG, as shown in FIG. 22, a direction of each divided image SG is different from that of the adjacent divided image SG in the width-arraying direction. Additionally, the direction of each divided image SG is equal that of the adjacent divided image SG in the longitudinal-arraying direction. Thus, in FIG. 22, divided-images SG1_2, 2_2, 3_2, and 4_2 of the second column from the left of the paper surface, divided-images SG1_4, 2_4, 3_4 and 4_4 of the fourth column are rotated. After the end of the image rotation process, then an image recording process is carried out.

[Image Recording Process] In the image recording process of the embodiment, for each longitudinal-direction-order-data LD, as in the case of the first embodiment, the divided-images SG are recorded on the recording-media. By such recording of each divided image SG, it can be said that each divided image SG is recorded from a direction different from that of the adjacent divided image SG in the width direction, and each output image OG is outputted.

The output images OG are then subjected to assembling work to form a complete image CG. In the assembling work of the embodiment, first, all the output images OG are unified again in direction as in the case of the first embodiment.

Subsequently, the output images OG are connected to each other. The output images OG are arrayed as in the case of the corresponding divided-images SG. Specifically, the output images OG are arrayed in the width-arraying direction dw in order from an output image OG where a divided image SG of small width-direction-order-data WD is recorded. Accordingly, the output images OG are arrayed in the longitudinal-arraying direction d1 in order from a divided image SG of small longitudinal-direction-order-data LD.

Figure 23:
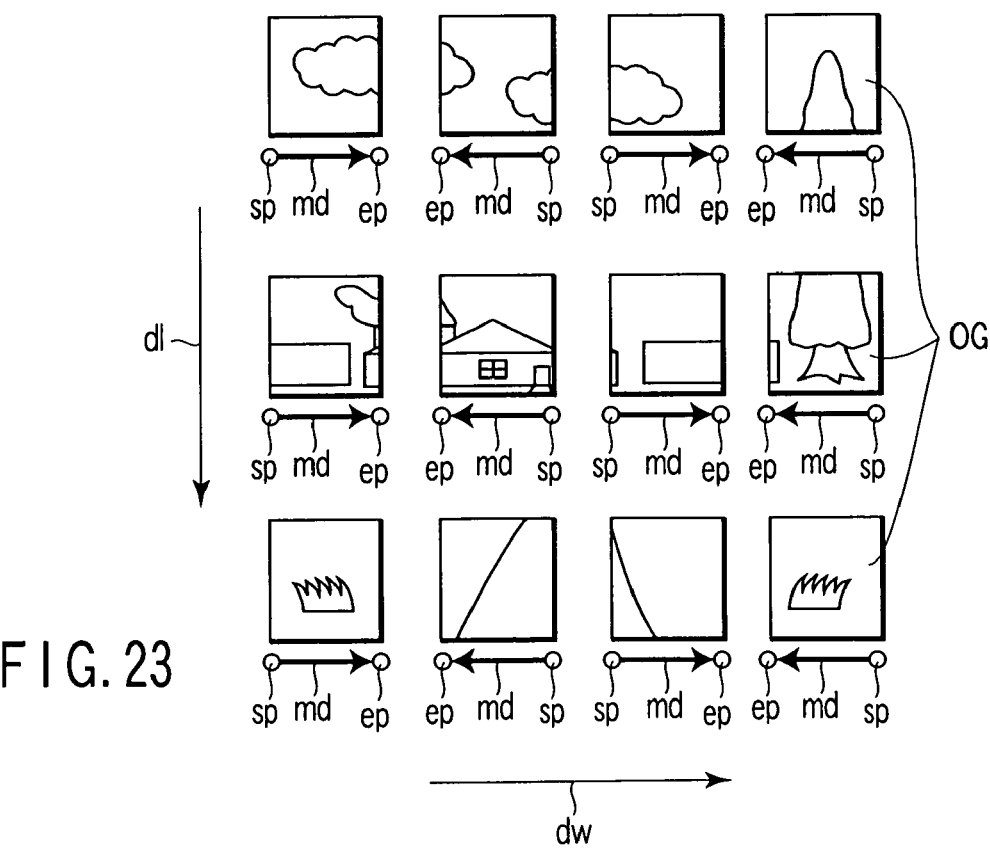
FIG. 23 is a view showing output images formed according to the seventh embodiment.

By such arrangement, each output image OG is adjacent to an output image OG where a different direction divided image has been recorded. That is, an output image OG where a divided image SG rotated by 180° is adjacent to an output image OG where a non-rotated divided image SG has been recorded. Thus, a recording-start position sp and a recording-end position ep of each output image OG are adjacent to similar those of an adjacent output image OG as shown in FIG. 23. Further, in the joined portion JP of the complete image CG, an end of each output image OG is adjacent to that of the adjacent output image OG on the same side in the main scanning direction during recording. Thus, even if there is an optical density difference (image density difference) between one end and the other end of each output image OG depending on accuracy of the image-recording apparatus or recording-medium characteristics, the density difference in the joined portion can be removed or reduced. Thus, the image-recording apparatus 1 can output a large image which exceeds the width of the recording-medium at high recording quality by outputting a plurality of output images OG as described above.

The image-recording apparatus 1 of the embodiment can divide the basic image data GD in the width direction and in the direction orthogonal to the width direction to record the divided images. Thus, even if the recording-medium is cut into predetermined sizes in both of the width direction and the direction orthogonal to the width direction, the image-recording apparatus 1 can form a complete image CG by dividing the basic image data into a plurality of recording-media to output them.

As in the case of the fourth to sixth embodiments, the image-recording apparatus 1 of the embodiment can divide each intermediate image MG into an even number in the width direction. Accordingly, in the case of forming an annular complete image, the image-recording apparatus 1 of the embodiment can output high-quality images.

Furthermore, according to the embodiment, image processing for the basic image data GD can be executed by a program on a personal computer. Specifically, a program for executing an image size determination process, an image division process and an image rotation process is installed on the personal computer to enable recording of formed divided images by the image-recording apparatus.

According to the embodiment, in the image rotation process, directions of the adjacent divided-images SG in the width-arraying direction dw are reversed to be different by 180°. However, in the image rotation process, directions of the adjacent divided-images SG can be reversed to be different by 180° in both of the width-arraying direction dw and the longitudinal direction d1. In this case, the output images OG can form a high-quality complete image even if there are image density differences and/or color tone differences not only in the width-arraying direction dw but also in the longitudinal direction d1.

Eighth Embodiment

Next, description will be made of an image-recording apparatus of an eighth embodiment. The image-recording apparatus 1 of the embodiment is different from the seventh embodiment in the image rotation process, but apparatus components etc. are similar to those of the first embodiment.

The image-recording apparatus 1 of the embodiment, a divided image SG is rotated in the image rotation process as in the case of the seventh embodiment. Then, a main CPU 41 decides a divided image SG to be recorded first. Then, the main CPU 41 obtains distances of divided-images SG from the first-recorded divided image SG. Specifically, for each divided image SG, the number of divided-images SG between each divided image SG and the first-recorded image SG in a width direction and a direction orthogonal to the width direction is obtained. For example, description will be made of a case where a divided image SG 1_1 shown in FIG. 24 is set as a first-recorded image.

Figure 24:
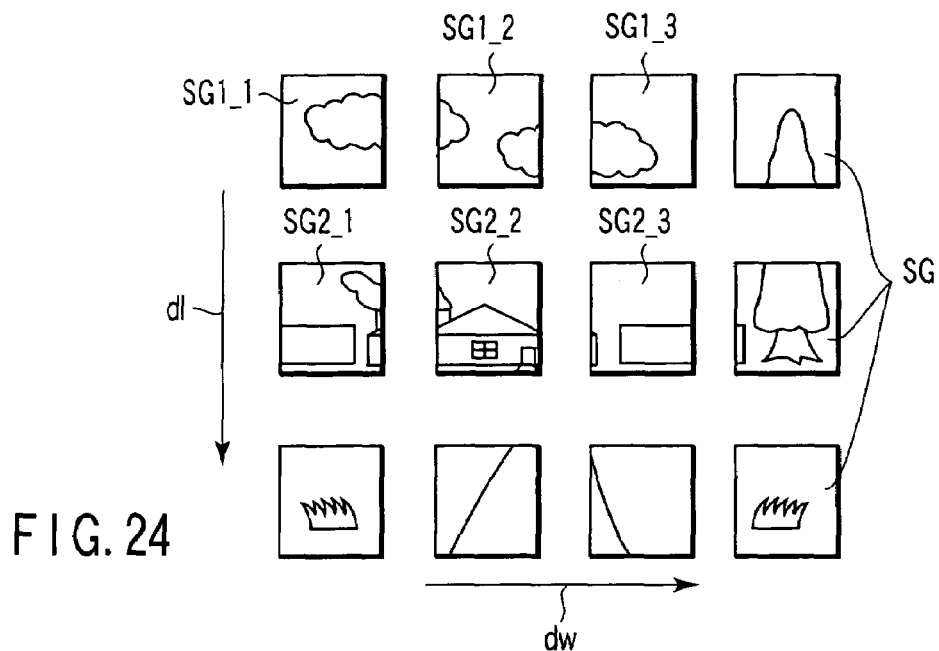
FIG. 24 is a view showing divided images formed according to an eight embodiment.
Figure 25:
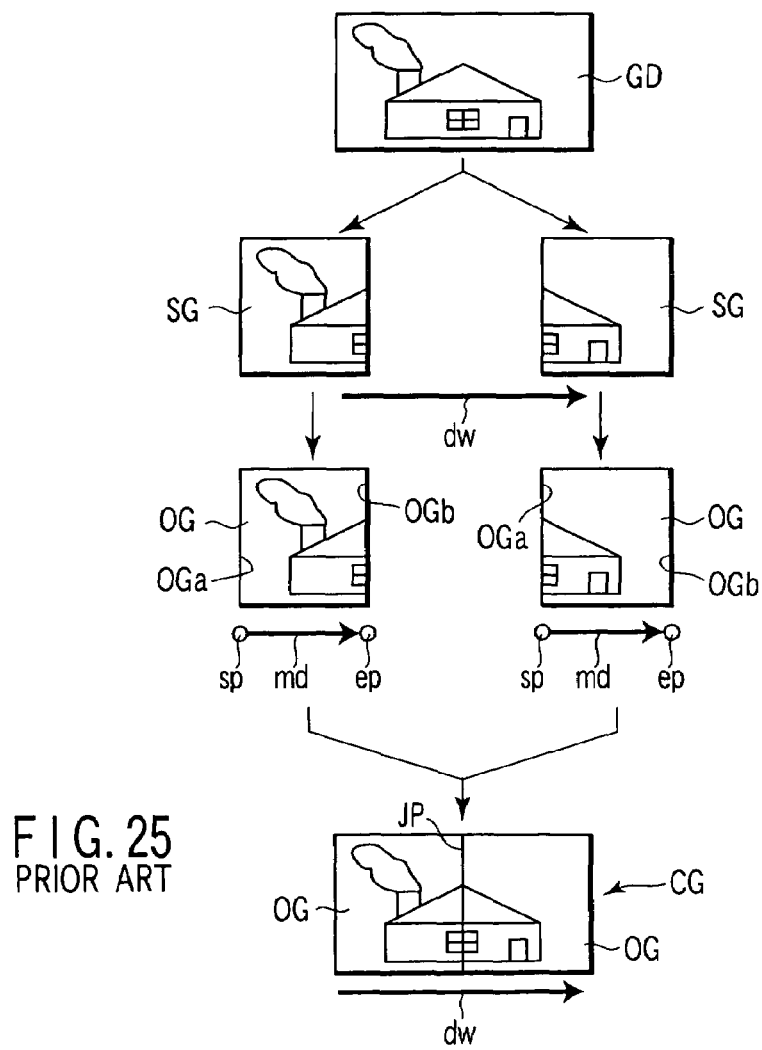
FIG. 25 is a view showing divided images and a complete image formed in a conventional image-recording apparatus.
Figure 26:
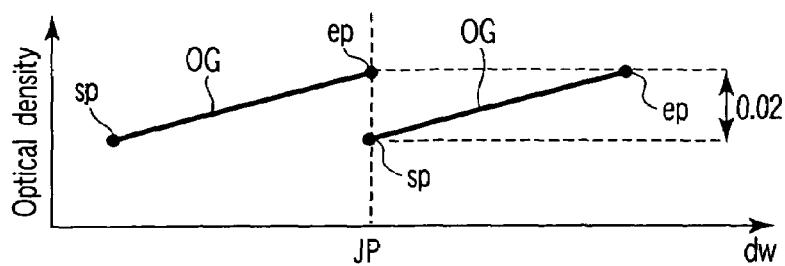
FIG. 26 is a view showing a distribution of an image density of a conventional complete image.
Figure 27:
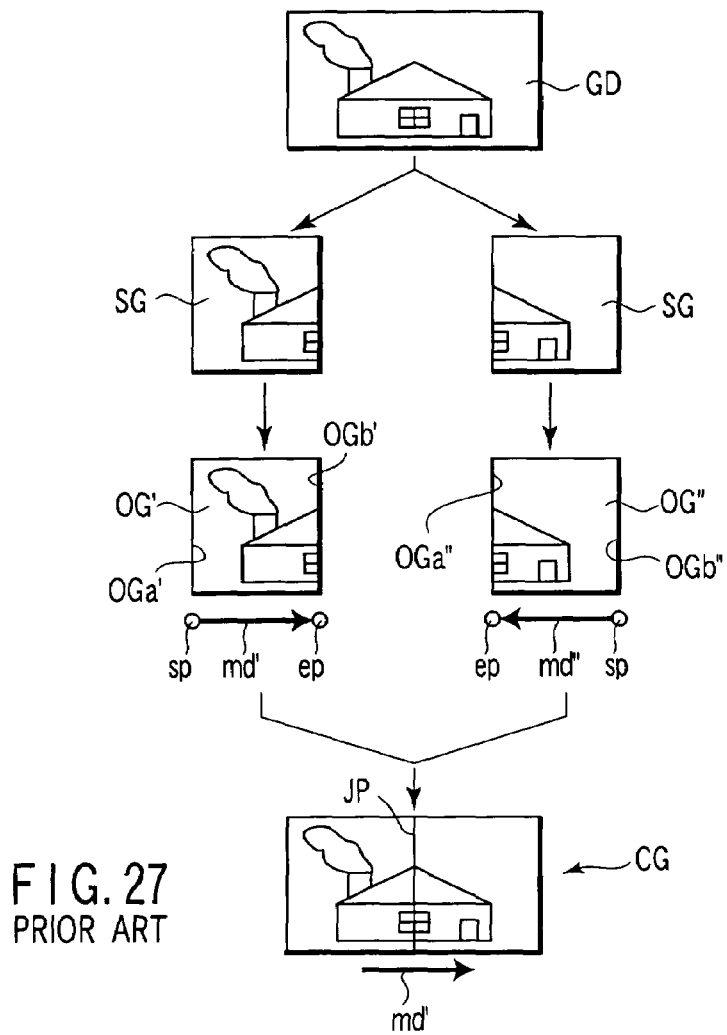
FIG. 27 is a view showing divided images and a complete image formed in the other conventional image-recording apparatus.
Figure 28:
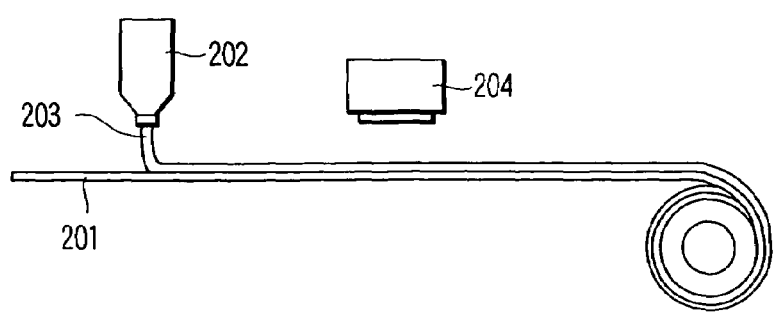
FIG. 28 is a view showing a recording-medium on which a coating solution is applied.

In FIG. 24, divided images adjacent to the divided image SG1_1 are divided-images SG1_2, 2_1. The divided image SG1_2 is adjacent to the divided image SG1_1 in the width direction. Accordingly, no image is present between the divided image SG1_2 and the divided image SG1_1. The divided image SG1_2 is in the same position as that of the divided image SG1_1 in the direction orthogonal to the width direction. The divided image SG1_2 is positioned apart by one divided image from the divided image SG1_1. Thus, it is assumed that the divided image SG1_2 is distant of 1 from the divided image SG1_1. Similarly, the divided image SG2_1 is distant of 1 from the divided image SG1_1 in the direction orthogonal to the width direction.

The divided image SG2_2 has no images interposed in the width direction or the direction orthogonal to the width direction. Thus, a distance of the divided image SG2_2 from the divided image SG1_1 is 1.

There is a divided image SG1_2 between the divided image SG1_3 and the divided image SG1 1 in the width direction. However, the divided image SG1_3 is in the same position as that of the divided image SG1_1 in the direction orthogonal to the width direction. Thus, a distance of the divided image SG1_3 is 2.

There is one divided image between the divided image SG2_3 and the divided image SG1 1 in the width direction. In the case of the divided image SG2_1, the divided image SG2_3 is in a position apart by one divided image from the divided image SG1_1 in the direction orthogonal to the width direction. Thus, a distance of the divided image SG2_3 is 3.

Formation order data MD are allocated to the divided-images SG in order of a small distance. A smallest value (e.g., 1) of the formation order data MD is allocated to the first-recorded divided image.

Then, the image-recording apparatus 1 records the divided-images SG in order of small formation order data MD. Accordingly, in the complete image CG of the embodiment, recording orders of the adjacent output images OG by the image-recording apparatus 1 can be set close to each other. Thus, even if recording-medium quality is changed due to the recording order, the image-recording apparatus 1 of the embodiment can output large images at high recording quality.

Ninth Embodiment

Next, description will be made of a ninth embodiment of the present invention. The image-recording apparatus 1 of the embodiment is different from the first embodiment in controlling of a control section, but apparatus components etc. are similar to those of the first embodiment.

The control section of the embodiment is different from that of the first embodiment in processing when a basic image data width GW is smaller or equal to a recording-medium width RW in an image side determination process. In the image-recording apparatus 1 of the embodiment, as in the case of the first embodiment, if the basic image data width GW is smaller or equal to the recording-medium width RW, basic image data GD is directly recorded on a recording-medium by image recording assembly 60. However, the image-recording apparatus 1 rotates the basic image data GD by 180° for each recording on one recording-medium. When the basic image data GD is subsequently recorded on a next recording-medium, the image-recording apparatus 1 records the rotated basic image data GD on the recording-medium.

Thus, the image-recording apparatus 1 records the same image sequentially on recording-media in different recording directions. Then, a plurality of output images OG thereof form a complete image CG.

By the aforementioned control, the same pattern is repeatedly recorded to enable outputting of a large image at high recording quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image-recording apparatus which divides a complete image that is larger in width than a recording-medium into a plurality of images and, which records the divided images on a plurality of recording-media, said image-recording apparatus comprising:
    an image recording assembly which includes a recording-head to record an image on the recording-medium, and a recording-medium-carrying mechanism to carry the recording-medium relatively to the recording-head; and
    a control section which includes an image-processing section to subject image data of the complete image to image processing, and which controls the image recording assembly,
    wherein the image-processing section divides the image data of the complete image into a plurality of image data pieces indicative of divided images, detects two adjoining divided-images that each individually have a joint portion and adjoin each other at the respective joint portions, in the divided images indicated by the divided image data pieces, and rotates one of the adjoining divided-images so as to make a recording direction of one of the adjoining divided-images opposite to a recording direction of the other adjoining divided-image, and
    wherein the control section controls the image recording assembly so that the recording medium is carried in one direction during recording of all divided-images, the divided images are recorded on the respective recording-media one by one to form a plurality of output images, and the plurality of output images configure one complete image.

2. The image-recording apparatus according to claim 1, wherein the control section controls the image recording assembly so that the joint portions of the divided images on adjacent recording media lie at a same position with respect to a width direction of the media.

3. The image-recording apparatus according to claim 1, wherein the image-processing section divides the image data of the complete image in a width direction thereof based on a maximum recordable width according to the recording-medium used for recording.

4. The image-recording apparatus according to claim 3, wherein when the image-processing section divides the image data of the complete image based on the maximum recordable width, a number of the divided image data pieces of the divided images is odd excluding 1, and there is a divided image of a width smaller than a width corresponding to the maximum recordable width, the image-processing section divides at least one of the image data pieces of the divided images into two substantially at a center to set the number of divided image data pieces to be even.

5. The image-recording apparatus according to claim 1, wherein the image-processing section divides the image data of the complete image into a predetermined number of the image data pieces so that the divided images are uniform in width.

6. The image-recording apparatus according to claim 5, wherein the predetermined number of divided image data pieces is even.

7. The image-recording apparatus according to claim 5, wherein the image-processing section changes magnification the image data pieces of the divided images so that a width of each of the divided images to be recorded is substantially equal to a width of a largest recording-medium to be used.

8. The image-recording apparatus according to claim 5, wherein the image-processing section compares the width of the divided image to be recorded with a maximum recordable width according to the recording-medium to be used, and when the width of the divided image is large, the image-processing section increases the number of divided image data pieces, and further divides the image data of the complete image.

9. The image-recording apparatus according to claim 5, wherein when a plurality of recording-media different in maximum recording width are selectively used, the control section compares the width of each of the divided images with a maximum recordable width according to each recording-medium, selects a recording-medium whose margin is smallest, and records each of the divided images using the recording-medium.

10. The image-recording apparatus according to claim 1, wherein the control section controls the image recording assembly to control an order of recording the divided images, and to sequentially record the divided images from an image nearest a first recorded divided image in arrangement of the image data pieces.

11. The image-recording apparatus according to claim 10, wherein the image recording assembly is controlled so as to obtain a number of the divided images between each divided image and the divided image to be recorded first in a width direction, and to start recording from a divided image that has a small number of divided images between itself and the divided image to be recorded first.

12. The image-recording apparatus according to claim 1, wherein the image-processing section obtains position information of the image data of the divided images in a width direction, and the control section controls the image recording assembly so as to record the divided images and the position information corresponding to the divided images on each of the recording-media.

13. An image forming method which divides a complete image that is larger in width than a recording-medium into a plurality of divided images, connects a plurality of recording-media on which the plurality of divided images are formed so as to form the complete image and mutually connects both ends of the complete image, said image forming method comprising:

dividing the complete image into an even number of the divided images;

detecting two of the divided-images each individually having a joint portion and adjoining each other at the respective joint portions;

rotating one of the two divided-images so as to make a recording direction of said one of the two divided-images opposite to a recording direction of the other one of the two divided-images, and to locate the joint portions of the two divided-images at one position in a width direction of the recording-medium; and carrying the recording medium in one direction during recording of the divided-images, wherein the divided-images are recorded on the respective recording-media one by one to form a plurality of output images, and wherein the plurality of output images configure the complete image.

* * * * *